United States Patent [19]
Futagi et al.

[11] Patent Number: 5,748,673
[45] Date of Patent: May 5, 1998

[54] DATA RECEIVING APPARATUS

[75] Inventors: Sadaki Futagi, Sagamihara; Mitsuru Uesugi, Yokohama, both of Japan

[73] Assignee: Matsushita Electric Industrial Co., Ltd., Osaka, Japan

[21] Appl. No.: 594,536

[22] Filed: Jan. 31, 1996

[30] Foreign Application Priority Data

Jan. 31, 1995 [JP] Japan .................... 7-014799

[51] Int. Cl.$^6$ .................... H03H 7/30; H03H 7/40
[52] U.S. Cl. .................... 375/232; 375/235; 375/341; 375/347; 375/350
[58] Field of Search .................... 375/347, 346, 375/349, 350, 229, 230, 232, 235, 341, 262; 379/406, 410; 455/296

[56] References Cited

FOREIGN PATENT DOCUMENTS

| | | |
|---|---|---|
| 4-35543 | 2/1992 | Japan . |
| 4-35544 | 2/1992 | Japan . |
| 4-35545 | 2/1992 | Japan . |
| 4-35546 | 2/1992 | Japan . |
| 4-35547 | 2/1992 | Japan . |
| 4-35548 | 2/1992 | Japan . |
| 4-35549 | 2/1992 | Japan . |
| 4-35550 | 2/1992 | Japan . |
| 5-344029 | 12/1993 | Japan . |
| 6-29890 | 2/1994 | Japan . |

OTHER PUBLICATIONS

H. Yoshino et al, Adaptive Interference Canceller Based Upon RLS–MLSE, The Transactions of the Institute of Electronics, Information and Communication Engineers B–II, vol. J77–B–II, No. 2, Feb. 1994, pp. 74–84.

*Primary Examiner*—Don N. Vo
*Attorney, Agent, or Firm*—Lowe, Price, LeBlanc & Becker

[57] ABSTRACT

A data receiving apparatus comprising: a receiving portion for receiving a desired radio wave signal including a desired baseband signal and an interference radio wave signal including an interference baseband signal, the desired radio wave signal and the interference radio wave signal having substantially the same frequency; first weighting circuit for weighting an output of the receiving circuit with a first coefficient adaptively renewed such that the desired baseband signal is reproduced; a subtracting circuit coupled to the first weighting circuit; a first judging circuit coupled to the first subtracting circuit; a second weighting circuit for weighting the baseband signal with a second coefficient adaptively renewed such that the interference baseband signal is reproduced; a second judging circuit coupled to the second weighting circuit; and a supplying circuit for supplying the reproduced interference baseband signal to the subtracting circuit, the subtracting circuit effecting a subtraction between an output of the first weighting circuit and an output of the supplying circuit. Modifications for diversity receiving, delayed component cancelling, receiving timing adjusting are also disclosed.

17 Claims, 21 Drawing Sheets

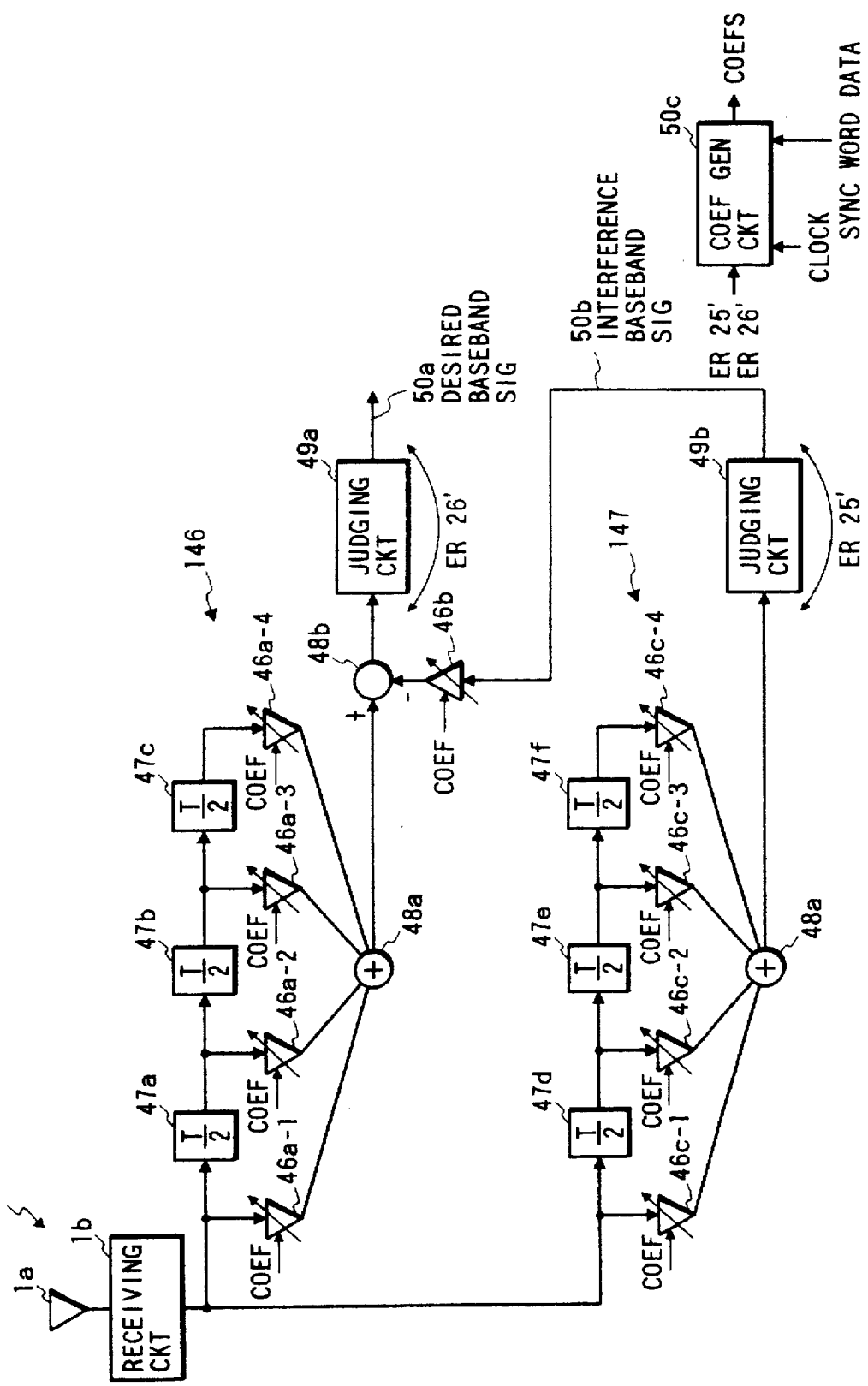

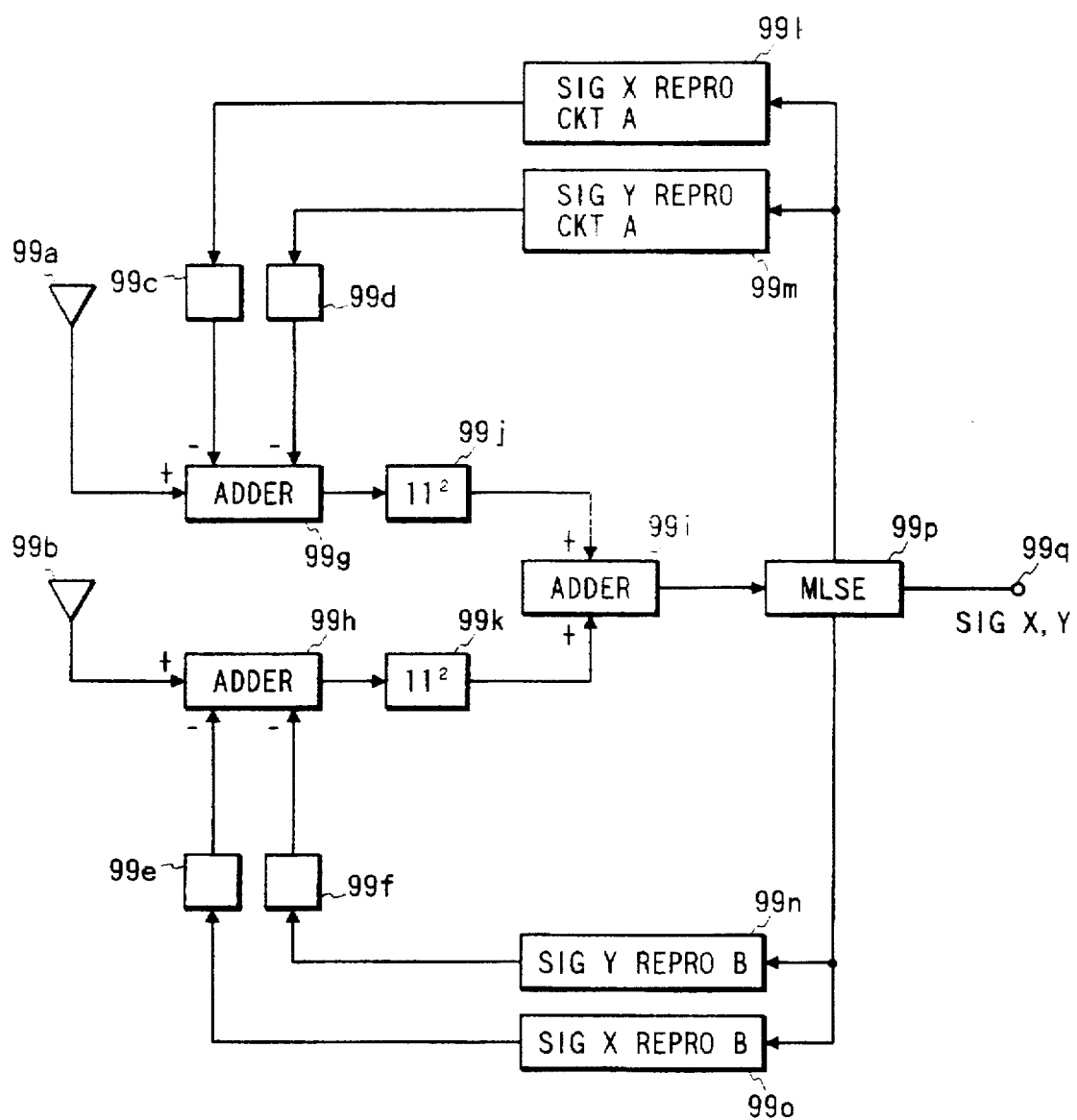

DATA RECEIVING APPARATUS

BACKGROUND OF THE INVENTION

1. Field of the Invention

This invention relates to a data receiving apparatus for receiving a radio wave data signal and particularly to a data receiving apparatus for receiving a radio wave data signal with interference reduced.

2. Description of the Prior Art

A data receiving apparatus for receiving a radio wave data signal with interference reduced is known. Though an intensity of the desired radio wave signal is sufficient for receiving, if an intensity of the interference signal is large thereat and the frequency of the interference signal is adjacent to the frequency of the desired radio wave signal, an interference may occur.

FIG. 17 is a prior art data receiving apparatus. This prior art data receiving apparatus comprises an antenna 93a for receiving a first radio wave signal 91, a weighting circuit 94 for weighting the received first radio wave signal, an antenna 93b for receiving a second radio wave signal 92, a weighting circuit 95 for weighting the received second radio wave signal, an adder 96 for summing outputs of weighting circuits 94 and 95, a judging circuit for judging a value of the output of the adder 96 to reproduce a desired data signal, and a coefficient generator 90 for renewing coefficients in the weighting circuits 94 and 95 successively to reduce an errors between the outputs of the adder 96 and the judging circuit 97.

It is assumed that the radio wave signals 91 and 92 respectively includes components as follows:

$$a(t)\, x(t) + b(t)\, y(t) \tag{1}$$

$$c(t)\, x(t) + d(t)\, y(t) \tag{2}$$

where x(t) is the desired signal, y(t) is an interference signal, and a(t), b(t), c(t), and d(t) are transfer functions respectively. The coefficient generator 90 successively renews coefficients in the weighting circuits 94 and 95 to reduce errors between the outputs of the adder 96 and the judging circuit 97. Therefore, if the weighting circuit 94 has a transfer function d(t) and weighting circuit 95 has a transfer function −b(t), the output of the adder 96 is given by (d(t)a(t)−b(t)c(t))x(t). Then the interference signal y(t) are cancelled. However, if d(t) a(t)=b(t) c(t), both desired and interference signals are cancelled, there may be a bit error.

FIG. 18 is a block diagram of a second prior art data receiving apparatus which is disclosed in Japan in Papers of The institute of Electronics, information and communication engineers, B-II vol. J77-B-II No. 2 pp 74–84 1994, 2. Each of antennas 99a and 99b receives a desired radio wave signal and interference radio wave signal. Outputs of the antennas 99a and 99b are supplied to adders 99g and 99h respectively. Outputs of the adders 99g and 99h are supplied to squaring circuits 99j and 99k respectively. Outputs of the squaring circuits 99j and 99k are added each other and the result is supplied to an MLSE equalizer 99p. The MLSE equalizer 99p outputs signal X and Y 99q and an internal condition which are supplied to a signal X reproduction circuit A 99l, a signal Y reproduction circuit A 99m, a signal X prediction circuit B 99o, and a signal Y reproduction circuit B 99n. Outputs of the signal X reproduction circuit A 99l, the signal Y reproduction circuit A 99m, the signal X prediction circuit B 99o, and the signal Y reproduction circuit B 99n are supplied to line prediction circuits 99c, 99d, 99e, and 99f respectively. Outputs of the line prediction circuits 99c and 99d are supplied to the adder 99g and outputs of the line prediction circuits 99e and 99f are supplied to the adder 99h.

The MLSE equalizer 99p has a condition representing both the desired baseband signal and the interference baseband signal. For example, assuming that the demodulation method is QPSK, the number of the conditions of each of the desired baseband signal and the interference baseband signal is four. Therefore, there are sixteen conditions. From the condition of the MLSE equalizer 99p, the signal X reproduction circuit A 99l reproduces the desired signal and the line prediction circuit 99c generates a replica signal of the desired signal (a(t)). Similarly, from the condition of the MLSE equalizer 99p, the signal Y reproduction circuit A 99m reproduces the interference signal and the line prediction circuit 99d generates a replica signal of the interference signal (b(t)). Similarly, the line prediction circuits 99e and 99f generate replica signals c(t) x(t) and d(t) y(t). An error is provided by subtracting a sum of the replica signals of the desired signal and the interference signal from the signal received by the antenna 99a. A square of the output of the adder 99g is obtained by the squaring circuit 99j and it represents a justfiablity, namely, a branch metric. Similarly, the output of the squaring circuit 99k represents a branch metric against the condition of the MLSE equalizer 99p. In this example, diversity receiving is effected by the adding the output of the squaring circuit 99j to the output of the squaring circuit 99k by the adder 99i, so that the output of the adder 99i represents a diversity branch metric. This operation is repeated to proceed the MLSE equalization, so that the interference and desired components can be predicted at the same time. Therefore, a quality of the desired radio wave signal can improved. However, an amount of calculation is large.

SUMMARY OF THE INVENTION

The aim of the present invention is to provide an improved data receiving apparatus.

According to the present invention there is provided a first data receiving apparatus comprising: a receiving portion for receiving a desired radio wave signal including a desired baseband signal and an interference radio wave signal including an interference baseband signal, a frequency of the interference radio wave signal being adjacent to that of the desired radio wave signal; a first weighting circuit for weighting an output of the receiving circuit with a first coefficient adaptively renewed such that the desired baseband signal is reproduced; a subtracting circuit coupled to the first weighting circuit; a first judging circuit coupled to the first subtracting circuit; a second weighting circuit for weighting the baseband signal with a second coefficient adaptively renewed such that the interference baseband signal is reproduced; a second judging circuit coupled to the second weighting circuit; and a supplying circuit for supplying an output of the second judging circuit to the subtracting circuit, the subtracting circuit effecting a subtraction between an output of the first weighting circuit and an output of the supplying circuit.

According to the present invention there is also provided a second data receiving apparatus comprising: a receiving circuit for receiving a desired radio wave signal including a desired baseband signal and first to (N+1)th interference radio waves including first to (N+1)th interference baseband signals respectively to produce a baseband signal including received desired baseband signal and received first to (N+1) th interference baseband signals, N being a natural number, the desired radio wave signal and the first to (N+1)th interference radio wave signals having substantially the same frequency; a weighting circuit for weighting the baseband with a first coefficient adaptively renewed such that the desired baseband signal is reproduced; a subtracting circuit coupled to the weighting circuit; a judging circuit coupled to the first subtracting circuit for reproducing the desired baseband signal; first to Nth weighting circuits for weighting the baseband signal with first to Nth coefficients adaptively renewed such that the first to N interference baseband signals are reproduced respectively; first to Nth subtracting circuits coupled to the first to Nth weighting circuits respectively; first to Nth judging circuits coupled to the first to Nth weighting circuit respectively; (N+1)th weighting circuit for weighting the baseband signal with (N+1)th coefficient adaptively renewed such that the (N+1)th interference baseband signal is reproduced; (N+1)th judging circuit coupled to the (N+1)th weighting circuit; and N supplying circuits. Mth supplying circuit out of the N supplying circuits supplying outputs of (N+1)th to (M+1)th judging circuits out of the first to (N+1)th judging circuits to Mth subtracting circuit out of the first to Nth subtracting circuit, M being a natural number smaller than N+1, the Mth subtracting circuit effecting a subtraction between an output of Mth weighting circuit out of the first to Nth weighting circuit and an output of the Mth supplying circuit; a supplying circuit for supplying outputs of first to (N+1)th judging circuits to the subtracting circuit, the subtracting circuit effecting a subtraction between an output of the weighting circuit and outputs of the N supplying circuits.

The first data receiving apparatus may be modified for diversity receiving as follows:

The receiving circuit comprises a plurality of antennas, the first weighing circuit comprises a plurality of first weighting units coupled to the plurality of antennas respectively and a first summing circuit for summing outputs of the plurality of first weighting units and supplying a first result to the subtracting circuit, the second weighing circuit comprises a plurality of second weighting units coupled to the plurality of antennas respectively and a second summing circuit for summing outputs of the plurality of second weighting units and supplying a second result to the second judging circuit.

The second data receiving apparatus may be modified for diversity receiving as follows:

The receiving circuit comprises a plurality of antennas, the first weighing circuit comprises a plurality of first weighting units coupled to the plurality of antennas respectively and a first adder for summing outputs of the plurality of first weighting units and supplying a first result to the subtracting circuit, each of the first to Nth weighing circuits comprises a plurality of second weighting units coupled to the plurality of antennas respectively and a second adder for summing outputs of the plurality of second weighting circuits and supplying a second result to each of the first to Nth subtracting circuit, and the (N+1)th weighing circuit comprises a plurality of third weighting units coupled to the plurality of antennas respectively and third adder for summing outputs of the plurality of third weighting units and supplying a third result to the (N+1)th judging circuit.

Modifications for delayed component cancelling, receiving timing adjusting are also disclosed. That is, the first and second data receiving apparatus may further comprise a removing circuit for removing delayed components in the desired baseband signal and the interference signal.

Moreover, the first and second data receiving apparatus may further comprise a compensation circuit for compensating a receiving timing of the received desired baseband signal and a receiving timing of the received interference baseband signal.

According to the present invention there is further provided a third data receiving apparatus comprising: a receiving circuit for receiving desired baseband signal including first identification information corresponding to identification data and an interference radio wave including an interference baseband signal having second identification information to produce a base band signal including received desired baseband signal and received interference baseband signal, the desired radio wave signal and the interference radio wave signal having substantially the same frequency; a first equalizing circuit for equalizing the baseband signal, detecting which of the desired ratio wave and the interference baseband signal has a larger intensity, and outputting a detected baseband signal; a detection circuit for detecting whether identification information in the detected baseband signal corresponds to identification data; a second equalizing circuit for equalizing the baseband signal such that the desired baseband signal is reproduced, the second equalizing circuit having a subtraction circuit for subtracting the detected baseband signal from the baseband signal when the identification information does not correspond to the identification data and a judging circuit for judging an output of the subtraction circuit to reproduce the desired baseband signal.

BRIEF DESCRIPTION OF THE DRAWINGS

The object and features of the present invention will become more readily apparent from the following detailed description taken in conjunction with the accompanying drawings in which:

FIG. 9A is a block diagram of a data receiving apparatus of a ninth embodiment;

FIG. 18 is a second prior art data receiving apparatus.

The same or corresponding elements or parts are designated with like references throughout the drawings.

DETAILED DESCRIPTION OF THE INVENTION

Hereinbelow will be described a first embodiment of this invention.

Figure 1A:
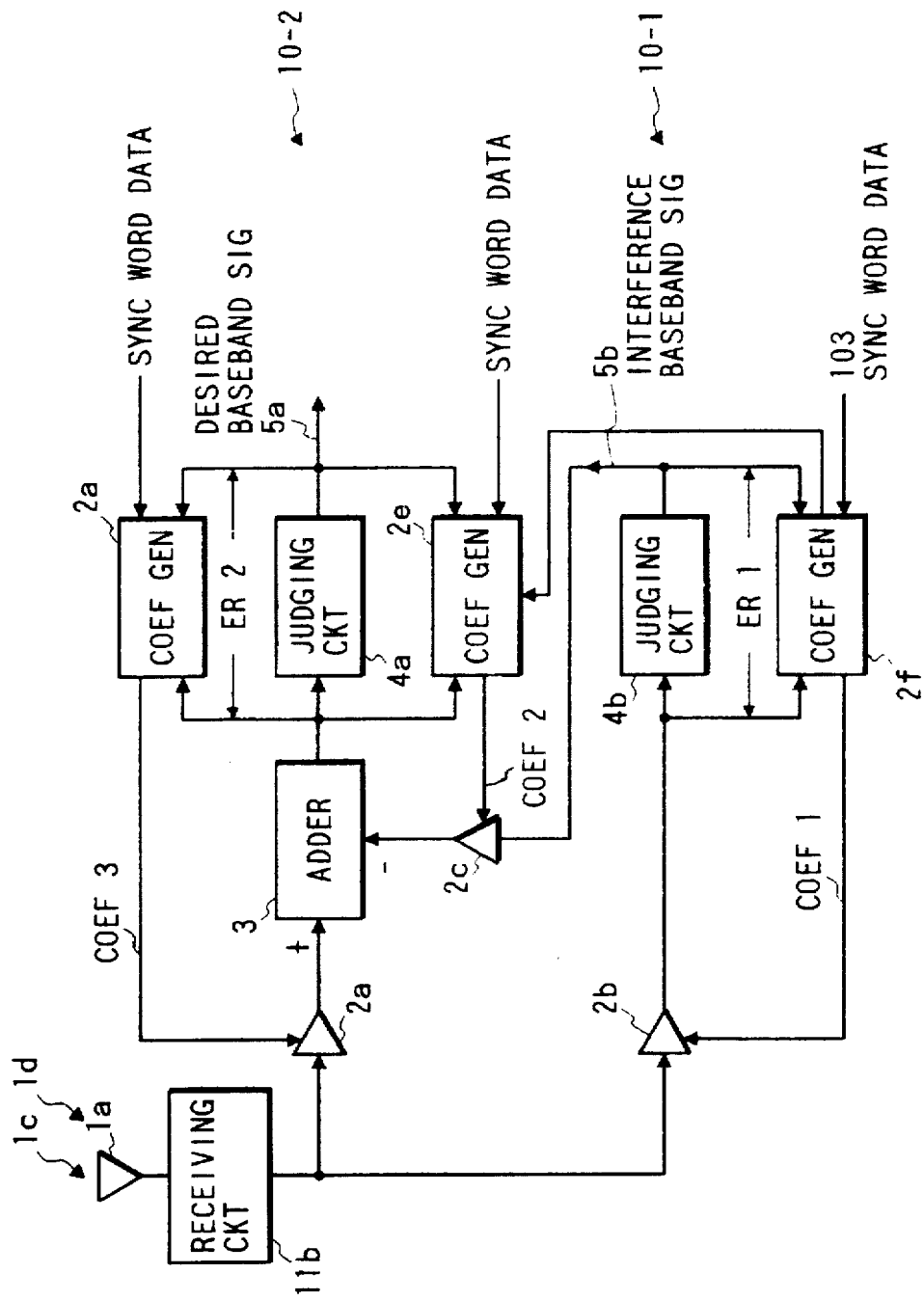
FIG. 1A is a block diagram of a data receiving apparatus of a first embodiment.

FIG. 1A is a block diagram of a data receiving apparatus of the first embodiment. The data receiving apparatus of the first embodiment comprises an antenna 1a for receiving a radio wave signal including a desired radio wave signal 1c including a desired baseband signal and an interference radio wave signal 1d including an interference baseband signal, a receiving circuit 11b for outputting a baseband signal including the desired baseband signal and the interference baseband signal from the received radio wave signal from the antenna 1a, a weighting circuit 2a for weighting the baseband signal with a coefficient coef3, a weighting circuit 2b for weighting the baseband signal with a first coefficient coef1, a judging circuit 4b for judging a value of an output of the weighting circuit 2b, a coefficient generation circuit 2f for comparing an output of the weighting circuit 2b with an output of the judging circuit 4b to detect a first error therebetween and generating the first coefficient coef1 successively renewed to minimize the first error to reproduce the interference baseband signal, a weighting circuit 2c for weighting an output of the judging circuit 4b with a second coefficient coef2, an adder for summing an output of the weighting circuit 2a and an output of the weighting circuit 2c, a judging circuit 4a for judging a value of an output of the adder 3, a coefficient generation circuit 2e for comparing an output of the adder 3 with an output of the judging circuit 4a to detect a second error therebetween and generating the second coefficient coef2 successively renewed to minimize the second error, and a coefficient generation circuit 2d for comparing an output of the adder 3 with an output of the judging circuit 4a to detect a third error therebetween and generating the second coefficient coef2 successively renewed to minimize the second error.

An operation of the first embodiment will be described.

The antenna 1a receives the radio wave signal including the desired baseband signal and an interference baseband signal. The receiving circuit 1b outputs the baseband signal including the desired baseband signal and the interference baseband signal from the received radio wave signal from the antenna 1a. The weighting circuit 2a weights the baseband signal with the coefficient coef3. The weighting circuit 2b weights the baseband signal with the coefficient coef1. The judging circuit 4b judges a value of an output of the weighting circuit 2b, that is, the judging circuit 4b discriminates a level of the output of the weighting circuit 2b between 1 and 0 for example. The coefficient generation circuit 2f receives a synchronizing word data corresponding to a synchronizing word of the desired baseband signal, detects the synchronizing word other than that of the desired baseband signal to detect the interference baseband signal and compares an output of the weighting circuit 2b with an output of the judging circuit 4b with respect to the synchronizing word to detect an error ER1 therebetween and generates the coefficient coef1 successively renewed to minimize the error ER1.

Then, the judging circuit 4b sends the reproduced interference baseband signal 5c to the adder 3 via the weighting circuit 2c to cancel the interference signal included in the received baseband signal.

The weighting circuit 2c weights the output of the judging circuit 4b with a coefficient coef2. The adder 3 subtracts the output of the weighting circuit 2c from the output of the weighting circuit 2a. The judging circuit 4a judges the value of an output of the adder to reproduce the desired baseband signal 5a, that is, the judging circuit 4b discriminates a level of the output of the weighting circuit 2b between 1 and 0 for example. The coefficient generation circuit 2d receives the synchronizing word data corresponding to the synchronizing word of the desired baseband signal, detects the synchronizing word of the desired baseband signal and compares the output of the adder 3 with the output of the judging circuit 4a with respect to the synchronizing word to detect an error ER2 therebetween and generates the coefficient coef3 successively renewed to minimize the error ER2. The coefficient generation circuit 2e receives the synchronizing word data corresponding to the synchronizing word of the desired baseband signal, detects the synchronizing word of the desired baseband signal and compares the output of the adder 3 with the output of the judging circuit 4a with respect to the synchronizing word to detect the error ER2 therebetween and generates the coefficient coef2 successively renewed to minimize the error ER2 such that an amplitude of a component of the reproduced interference baseband signal is suppressed.

Figure 1B:
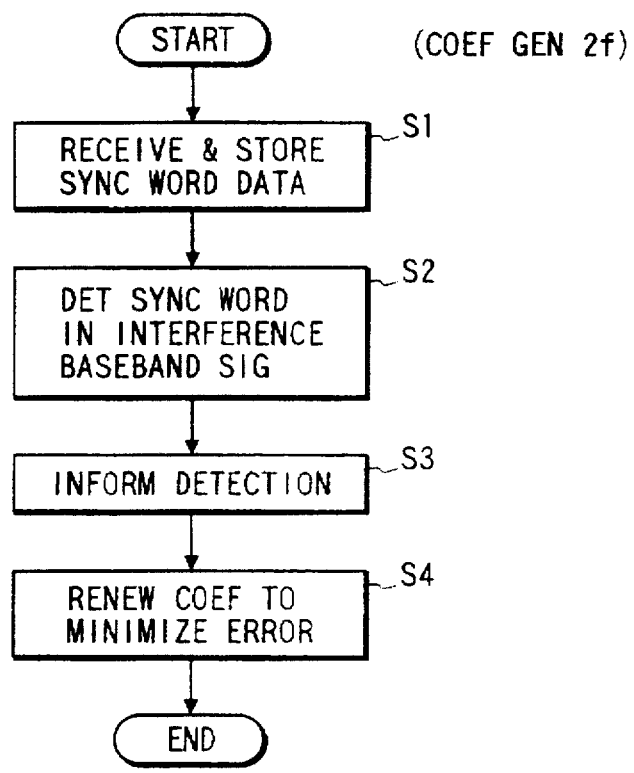
FIG. 1B is a diagram of a flow chart of the coefficient generation circuit of the first embodiment.
Figure 1C:
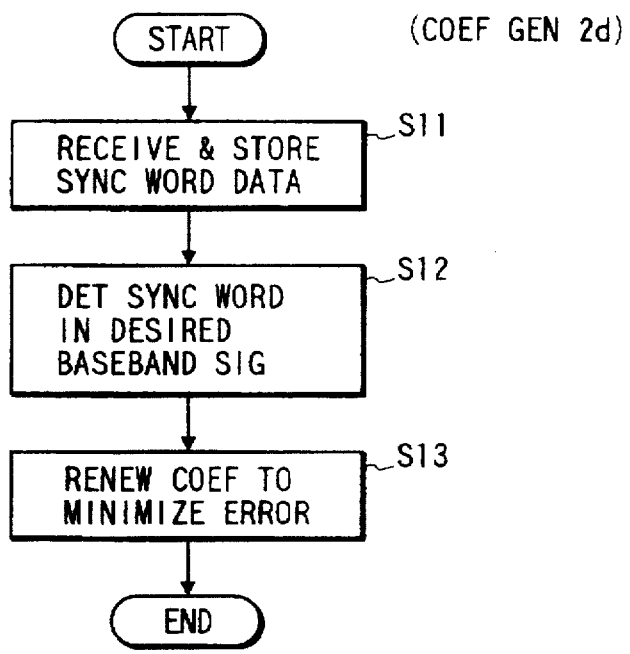
FIG. 1C is a diagram of a flow chart of the coefficient generation circuits of the first embodiment.

The coefficient generation circuits 2d, 2e, and 2f comprise digital signal processors respectively. However, the operations of these coefficient generation circuits 2d, 2e, and 2f may be executed by only one digital signal processor. FIG. 1B is a diagram of a flow chart of the coefficient generation circuit 2f of the first embodiment. FIG. 1C is a diagram of a flow chart of the coefficient generation circuits 2d and 2e of the first embodiment.

The coefficient generation circuit 2f receives and stores the synchronizing word data for discriminating the desired baseband signal in step s1. In step s2, the coefficient generation circuit 2f detects a synchronizing word of the interference baseband signal in the output of the judging circuit 4b. That is, the coefficient generation circuit 2f detects whether a synchronizing word does not correspond to the received synchronizing word data, in step s2. When the synchronizing word does not correspond to the received synchronizing word data, the coefficient generation circuit 2f informs the coefficient generation circuit 2e of this in step s3. Then, the coefficient generation circuit 2f renews the coefficient coef1 such that the error (difference) ER1 between the output of the judging circuit 4b and the output of the weighting circuit 2b to equalize the interference baseband signal having the synchronizing word which is different from the received synchronizing word data in data pattern for identifying in step s3. Steps s2 and s3 are repeatedly executed to minimize the error ER1. That is, the weighting circuit 2b, the judging circuit 4b, and the coefficient generation circuit 2f detects a baseband signal having a larger intensity at the antenna 1a which can be easily detected without a special technique and detects that the detected baseband signal is not the desired baseband signal by comparing the synchronizing word 101 having a synchronizing data pattern and an identification data pattern with the synchronizing word data. FIG. 1E is an illustration of this invention. The synchronizing word 101 has the synchronizing data pattern and the identification data pattern.

The coefficient generation circuit 2d receives and stores the synchronizing word data for discriminating the desired baseband signal in step s11. In step s12, the coefficient generation circuit 2d detects a synchronizing word in the desired baseband signal. That is, the coefficient generation circuit 2d detects or confirms whether a synchronizing word corresponding to the received synchronizing word data in step s12. The coefficient generation circuit 2d renews the coefficient coef3 such that the error (difference) ER2 between the output of the judging circuit 4a and the output of the adder 3 to equalize the desired baseband signal having the synchronizing word corresponding to the received synchronizing word data in step s13. Steps s2 and s3 are repeatedly executed to minimize the error ER2.

Figure 1D:
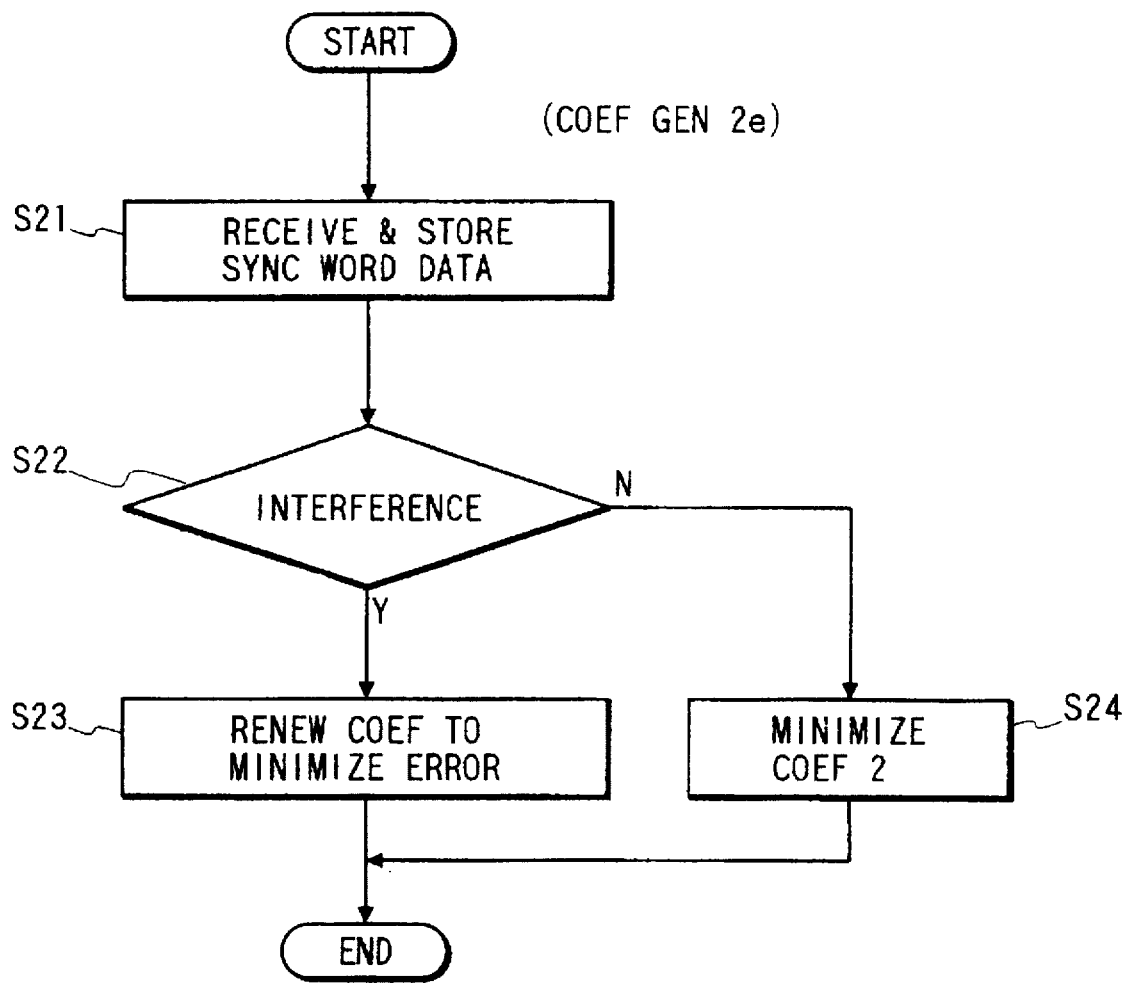
FIG. 1D is a diagram of a flow chart of the coefficient generation circuit of the first embodiment.
Figure 1E:
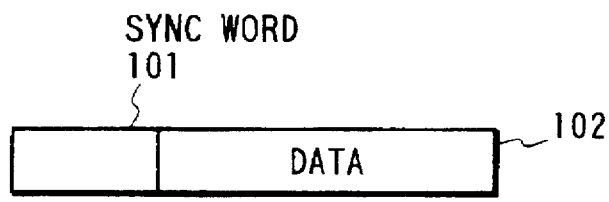
FIG. 1E is an illustration of this invention.

FIG. 1D is a diagram of a flow chart of the coefficient generation circuit 2e of the first embodiment. The coefficient generation circuit 2e receives and stores the synchronizing word data for discriminating the desired baseband signal in step s21. In step s21, the coefficient generation circuit 2e detects a synchronizing word in the desired baseband signal. That is, the coefficient generation circuit 2d detects or confirms whether a synchronizing word corresponding to the received synchronizing word data in step s22. In the following step s22, in response to the coefficient generation circuit 2f, the coefficient generation circuit 2e makes a decision as to whether or not the output of the judging circuit 4b is the interference baseband signal. When the output of the judging circuit 4b is the interference baseband signal. The coefficient generation circuit 2d renews the coefficient coef2 such that the error (difference) ER2 between the output of the judging circuit 4a and the output of the adder 3 to equalize the desired baseband signal having the synchronizing word corresponding to the received synchronizing word data in step s23. When the output of the judging circuit 4b is the desired baseband signal. The coefficient generation circuit 2d generates the coefficient coef2 such that the output of the weighting circuit 2c is minimized or cut off.

More specifically, it is assumed that baseband signal of the received radio wave signal is represented by Eq. (1), that is, a(t)x(t)+b(t)y(t), where x(t) is the desired baseband signal, y(t) is the interference baseband signal, and a(t), b(t), c(t), and d(t) are transfer functions of respective signals.

The antenna 1 receives the radio wave signal including the desired baseband signal and the interference baseband signal as represented by Eq. (1). The weighting circuit 2a weights the received radio wave signal from the antenna 1 with the coefficient coef3 corresponding to the transfer function a(t). More specifically, the coefficient generation circuit 2d generates and renews the coefficient successively such that a difference between the output of the adder 3 and the output of the judging circuit 4a is minimized. The weighting circuit 2b weights the received radio wave signal from the antenna 1 with the coefficient coef1 corresponding to the transfer function b(t). More specifically, the coefficient generation circuit 2f generates and renews the coefficient coef1 successively such that a difference between the output of the weighting circuit 2b and the output of the judging circuit 4b is minimized with respect to the synchronizing word of the interference signal. That is, the output of the weighting circuit 2b is given by:

$$\{a(t)x(t)+b(t)y(t)\}/b(t)=a(t)x(t)/b(t)+y(t) \quad (2)$$

If a(t)<b(t), the interference baseband signal 5b is obtained at the output of the judging circuit 4b. The weighting circuit 2c weights the output signal of the judging circuit 4b, that is, the interference baseband signal 5c with the coefficient z(t) (coef2). The adder 3 subtracts an output of the weighting circuit 2c from an output of the weighting circuit 2a and the output of the adder 3 is given by:

$$\{a(t)x(t)+b(t)y(t)\}/a(t)-x(t)y(t)$$

$$=x(t)+b(t)y(t)/a(t)-x(t)y(t) \quad (3)$$

As clearly understood from Eq. (3), if z(t)=b(t)/a(t), the output of the adder 3 is x(t) irrespective of any condition of y(t), so that the interference signal 5b included in the received radio wave signal can be cancelled at the output of the adder 3.

The judging circuit 4a judges the value of an output of the adder 3 to reproduce the desired signal 5a.

As mentioned, The receiving circuit 11b receives, via antenna 1a, a radio wave signal including the desired baseband signal including first identification information 101 corresponding to identification data 103 and an interference radio wave including an interference baseband signal having second identification information to produce a base band signal including received desired baseband signal and received interference baseband signal. The desired radio wave signal and the interference radio wave signal has substantially the same frequency. The first equalizing circuit 10-1 equalizes the baseband signal, detects which of the desired ratio wave and the interference baseband signal has a larger intensity, and outputs the detected baseband signal. The coefficient generation circuit 2f detects whether synchronizing word in the detected baseband signal corresponds to synchronizing data 103 (step s2). The second equalizing circuit 10-2 equalizes the baseband signal such that the desired baseband signal is reproduced. The second equalizing circuit 10-2 has the subtraction circuit (adder) 3 for subtracting the detected baseband signal from the baseband signal when the synchronizing word 101 does not correspond to the synchronizing word data 103 (step s22) and the judging circuit 4a judges the output of the subtraction circuit to reproduce the desired baseband signal.

A second embodiment will be described.

Figure 2:
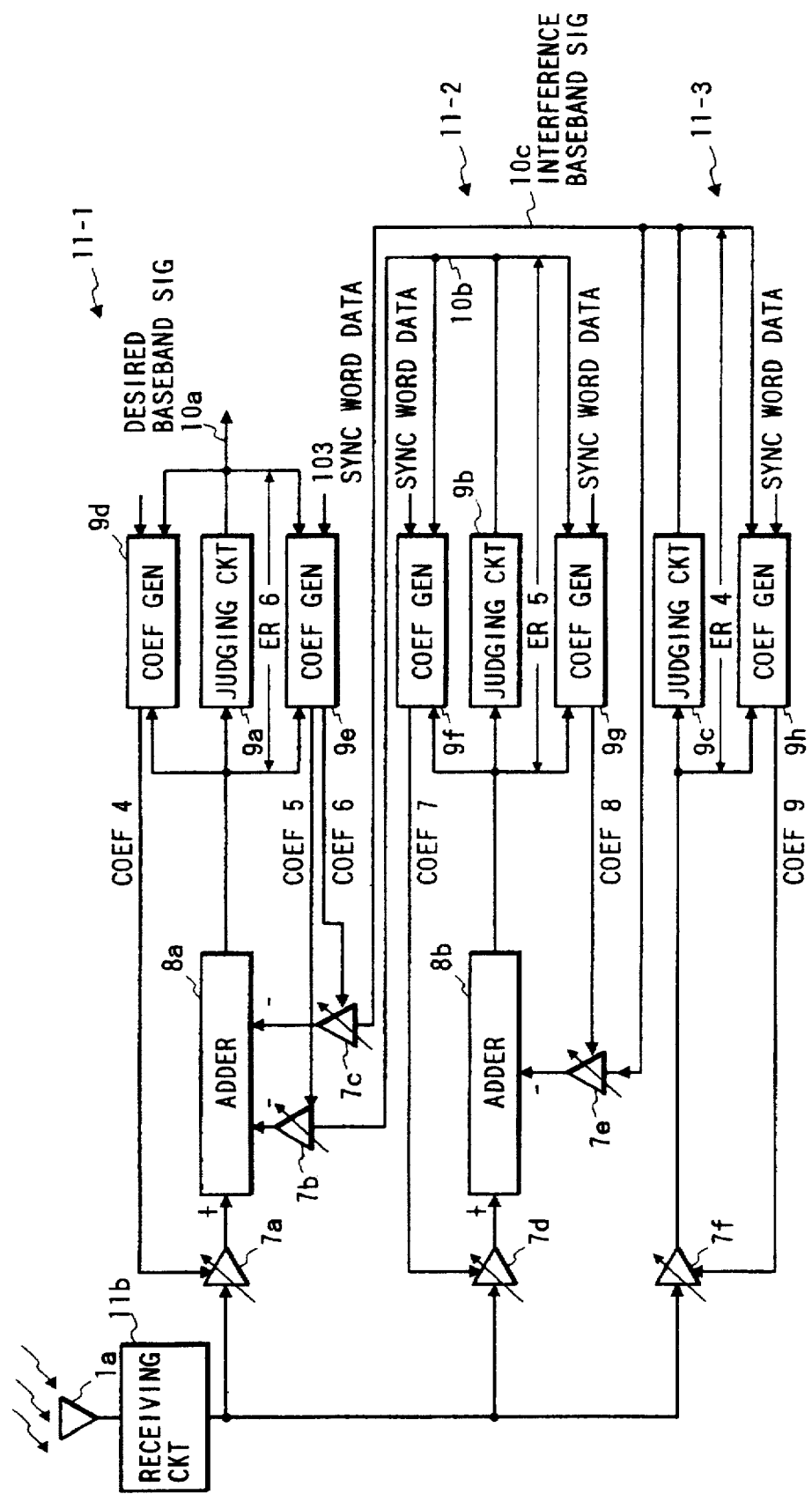
FIG. 2 is a block diagram of a data receiving apparatus of a second embodiment.

FIG. 2 is a block diagram of a data receiving apparatus of the second embodiment. The data receiving apparatus of the second embodiment comprises an antenna 1a for receiving a radio wave signal including a desired baseband signal and first and second interference baseband signals, a receiving circuit 11b for outputting a baseband signal including the desired baseband signal and the first and second interference baseband signals from the received radio wave signal from the antenna 1a, a weighting circuit 7a for weighting the baseband signal with a coefficient coef4, a weighting circuit 7d for weighting the baseband signal with a coefficient coef7, a weighting circuit 7f for weighting the baseband signal with a coefficient coef9, a weighting circuit 7e for weighting a first interference signal 10c with a coefficient coef8, a weighting circuit 7c for weighting the first interference signal 10c with a coefficient coef6, a weighting circuit 7b for weighting the second interference signal 10b with a coefficient coef5, a judging circuit 9c for judging a value of an output of the weighting circuit 7f to reproduce the first interference baseband signal 10c, a coefficient generation circuit 9h for comparing an output of the weighting circuit 7f with an output of the judging circuit 9c to detect an error ER4 therebetween and generating the coefficient coef9 successively renewed to minimize the error ER4, an adder 8b for adding an output of the weighting circuit 7d and an output of the weighting circuit 7e, a judging circuit 9b for judging a value of an output of the adder 8b to reproduce the second interference signal l0b, a coefficient generation circuit 9g for comparing an output of the adder 8b with an output of the judging circuit 9b to detect an error ER5 therebetween and generating the coefficient coef8 successively renewed to minimize the error ER5, an adder 8a for adding an output of the weighting circuit 7a and outputs of the weighting circuit 7b and 7c, a judging circuit 9a for judging a value of an output of the adder 8a to reproduce the desired signal 10a, a coefficient generation circuit 9e for comparing an output of the adder 8a with an output of the judging circuit 9a to detect an error ER6 therebetween and generating the coefficients coef5 and coef6 successively renewed to minimize the error ER6, and a coefficient generation circuit 9d for comparing an output of the adder 8a with an output of the judging circuit 9a to detect the error ER6 therebetween and generating the coefficient coef4 successively renewed to minimize the error ER6. The weighing circuit 7a, the adder 8a, the judging circuit 9a, coefficient generation circuits 9d and 9e, weighting circuits 7b and 7c form a first equalizer 11-1. The weighting circuit 7d, the adder 8b, the judging circuit 9b, the coefficient generation circuits 9f and 9g, the weighting circuit 7e form a second equalizer 11-2. The weighting circuit 7f, the judging circuit 9b, the coefficient generation circuit 9h form a third equalizer 11-3. In this embodiment, there are two interference radio wave signals received by the antenna 1a. However, if the number of the interference radio wave signals received by the antenna 1a is more than two, additional circuit(s) can be provided to suppress the interference baseband signals. Therefore, if there is n interference radio wave signals received by the antenna 1a, n+1 equalizers including the first equalizer 11-1 should be provided, wherein n is a natural number.

An operation of the second embodiment will be described.

The equalizer 11-3 detects or equalizes the second interference baseband signal 10c as similar to the first embodiment. That is, the operation of the coefficient generation circuit 9h is similar to that of the coefficient generation circuit 2f of the first embodiment. That is, the coefficient generation circuit f9c receives synchronizing word data corresponding to a synchronizing word of the desired baseband signal 10a, detects the synchronizing word other than that of the desired baseband signal and compares an output of the weighting circuit 7f with an output of the judging circuit 9c with respect to the synchronizing word to detect an error ER4 therebetween and generates the coefficient coef9 successively renewed to minimize the error ER4. In other word, the equalizer 11-3 detects the interference baseband signal 10c derived from the interference radio wave signal having a largest intensity at the antenna 1a. In the equalizer 11-2, the component of the interference baseband signal 10c is suppressed at the adder 8b, so that the equalizer 11-2 detects the interference baseband signal 10b having the second largest intensity of the interference radio wave signal at the antenna 1a. Therefore, the equalizer 11-1 equalizes, that is, detects, the desired baseband signal, with the interference baseband signals 10b and 10c suppressed. If there is only one interference noise to be suppressed, the equalizer 11-2 outputs no interference baseband signal.

A third embodiment will be described.

Figure 3:
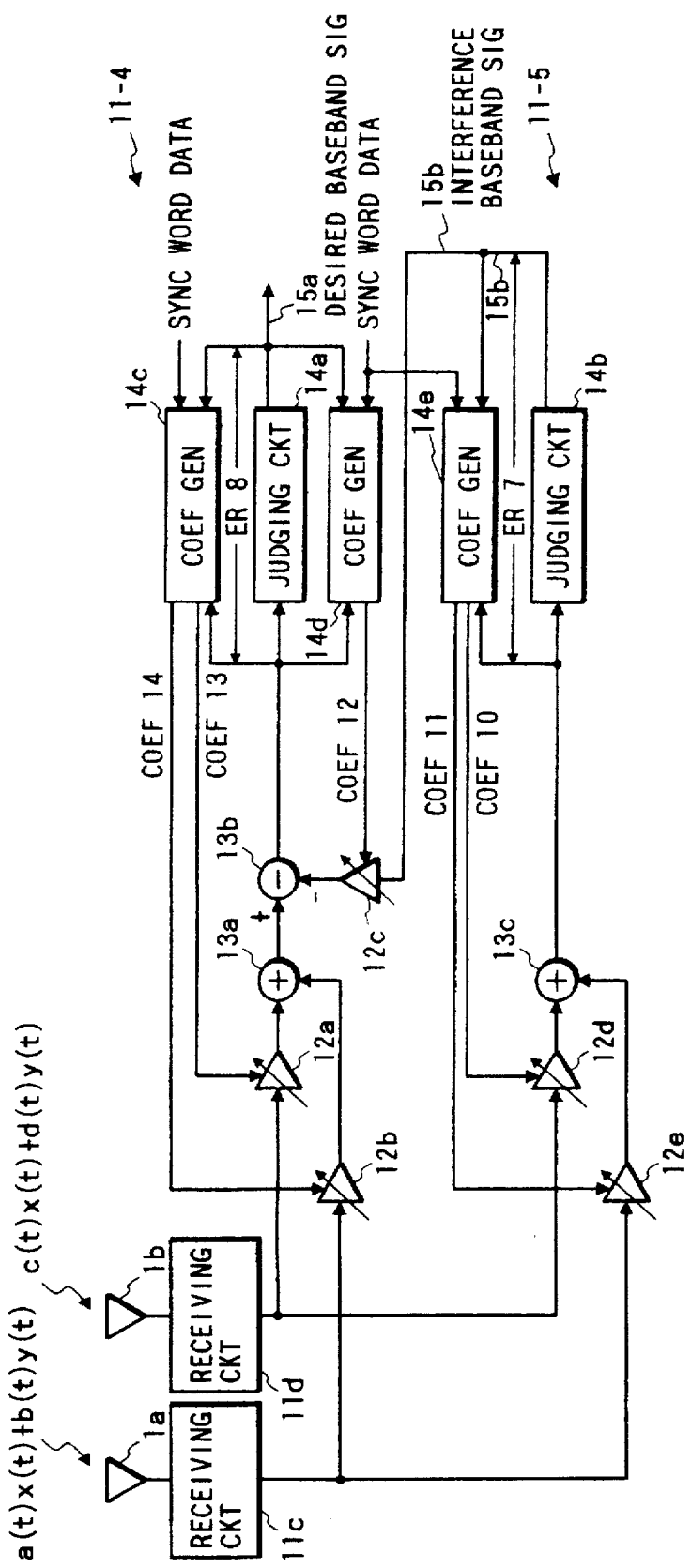
FIG. 3 is a block diagram of a data receiving apparatus of a third embodiment.

FIG. 3 is a block diagram of a data receiving apparatus of the third embodiment. The data receiving apparatus of the third embodiment comprises an antenna 1a for receiving a first radio wave signal including a desired radio wave signal including a desired signal and an interference radio wave signal including an interference signal, an antenna 1b for receiving a second radio wave signal including a desired radio wave signal including a desired signal and an interference radio wave signal including an interference signal, a receiving circuit 11c for receiving radio wave signal received by the antenna 1a and outputs a first baseband signal, a receiving circuit 11d for receiving the radio wave signal received by the antenna 1b and outputs a second baseband signal, a weighting circuit 12a for weighting the second baseband signal from the receiving circuit 11d, a weighting circuit 12b for weighting the first baseband signal from the receiving circuit 11c, an adder 13a for summing output signals of the weighting circuits 12a and 12b, a weighting circuit 12d for weighting the second baseband signal from the receiving circuit 11d, a weighting circuit 12e for weighting the first baseband signal from the receiving circuit 11c, an adder 13c for summing output signals of the weighting circuits 12d and 12e, a judging circuit 14b for judging a value of an output of the adder 13c to reproduce an interference signal 15c, a weighting circuit 12c for weighting an output of the judging circuit 14b, an adder 13b for subtracting an output of the weighting circuits 12c from an output signal of the adder 13a, a judging circuit 14a for judging a value of an output of the adder 13b to reproduce the desired signal 15a, a coefficient generation circuit 14e for comparing an output of the adder 13c with an output of the judging circuit 15b to detect an error ER7 therebetween and generating the coefficients coef10 and coef11 successively renewed to minimize the error ER7, a coefficient generation circuit 14d for comparing an output of the adder 13b with an output of the judging circuit 14a to detect an error ER8 therebetween and generating the coefficient coef12 successively renewed to minimize the error ER8, and a coefficient generation circuit 14c for comparing an output of the adder 13b with an output of the judging circuit 14a to detect the error ER8 therebetween and generating the coefficients coef13 and coef14 successively renewed to minimize the error ER8.

The antennas 1a are a predetermined distance apart from the antenna 1b, so that transfer functions in the received radio wave are different between the antennas 1a and 1b. That is, the antenna 1a receives the radio wave signal represented by the Eq. (1), i.e., $a(t)x(t)+b(t)y(t)$ and the antenna 1b receives the radio wave signal represented by the Eq. (2), i.e., $c(t)x(t)+d(t)y(t)$ where $x(t)$ is the desired signal, $y(t)$ is an interference signal, and $a(t)$, $b(t)$, $c(t)$, and $d(t)$ are transfer functions respectively. The coefficient generator 14e renews coefficients supplied to the weighting circuits 12d and 12d successively to reduce errors between the outputs of the adder 13c and the judging circuit 14b such that the interference baseband signal 15b is detected through the diversity receiving by the antennas 1a and 1b, receiving circuits 11c and 11d, and the weighting circuits 12d and 12e, and the adder 13c. Moreover, the coefficient generation circuit 14e receives the synchronizing word data corresponding to a synchronizing word of the desired baseband signal 15a, detects the synchronizing word other than that of the desired baseband signal and compares an output of the adder 13c with an output of the judging circuit 14b with respect to the synchronizing word to detect an error ER7 therebetween and generates the coefficients coef10 and coef11 successively renewed to minimize the error ER7. In other word, an equalizer 11-5 detects the interference baseband signal 15b derived from the interference radio wave signal.

On the other hand, the coefficient generation circuit 14c successively renews th coefficient coef14 such that the error (difference) ER8 between the output of the judging circuit 4a and the output of the adder 3 to equalize the desired baseband signal having the synchronizing word corresponding to the received synchronizing word data.

Moreover, the coefficient generation circuit 14d successively renews the coefficient coef12 such that the error (difference) ER8 between the output of the judging circuit 4a and the output of the adder 3 to equalize the desired baseband signal having the synchronizing word corresponding to the received synchronizing word data and the interference signal 15 is suppressed at the output of the adder 13b. In this embodiment, there is provided a diversity receiving, so that the equalizer 11-5 can detects the interference baseband signal if it has a larger intensity than the desired baseband signal.

A fourth embodiment will be described.

Figure 4:
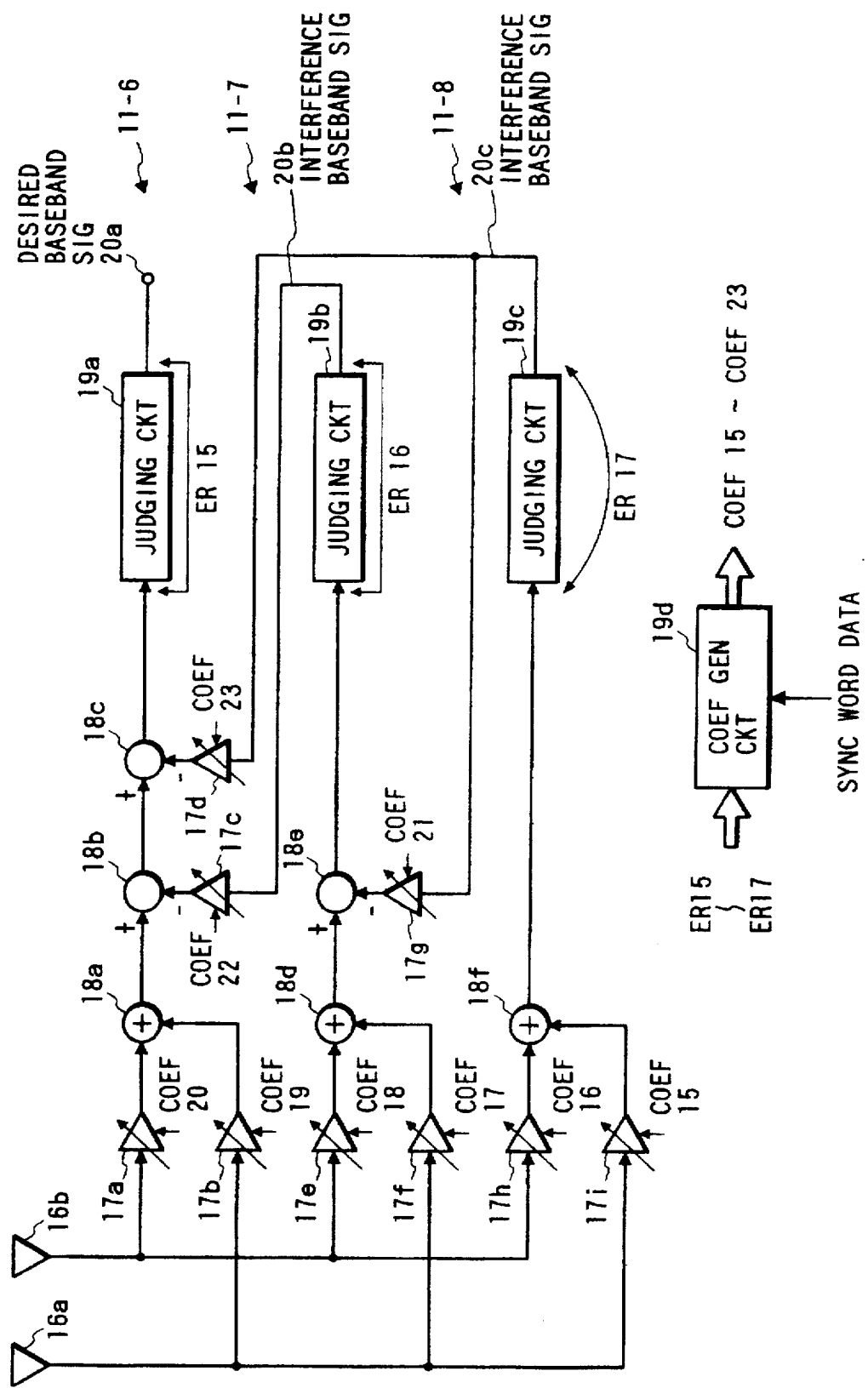
FIG. 4 is a block diagram of a data receiving apparatus of a fourth embodiment.

FIG. 4 is a block diagram of a data receiving apparatus of the fourth embodiment. In the third embodiment, the number of the interference baseband signal is one. However, more than one of interference baseband signals can be suppressed by providing the equalizers in addition to the equalizers in FIG. 3 as similar to the relation between the first and second embodiments. That is, an equalizer 11-8 detects an interference baseband signal 20c, an equalizer 11-7 detects an interference baseband signal 20b with a component of the interference baseband signal 20c in an adder 18d suppressed, and an equalizer 11-6 detects the desired baseband signal 20a with components of the interference baseband signals 10b and 20c in an adder 18a suppressed. Coefficients ER15 to ER23 are generated and successively renewed by a coefficient generation circuit 19d from the error ER15 to ER17 and the synchronizing word data.

A fifth embodiment will be described.

Figure 5:
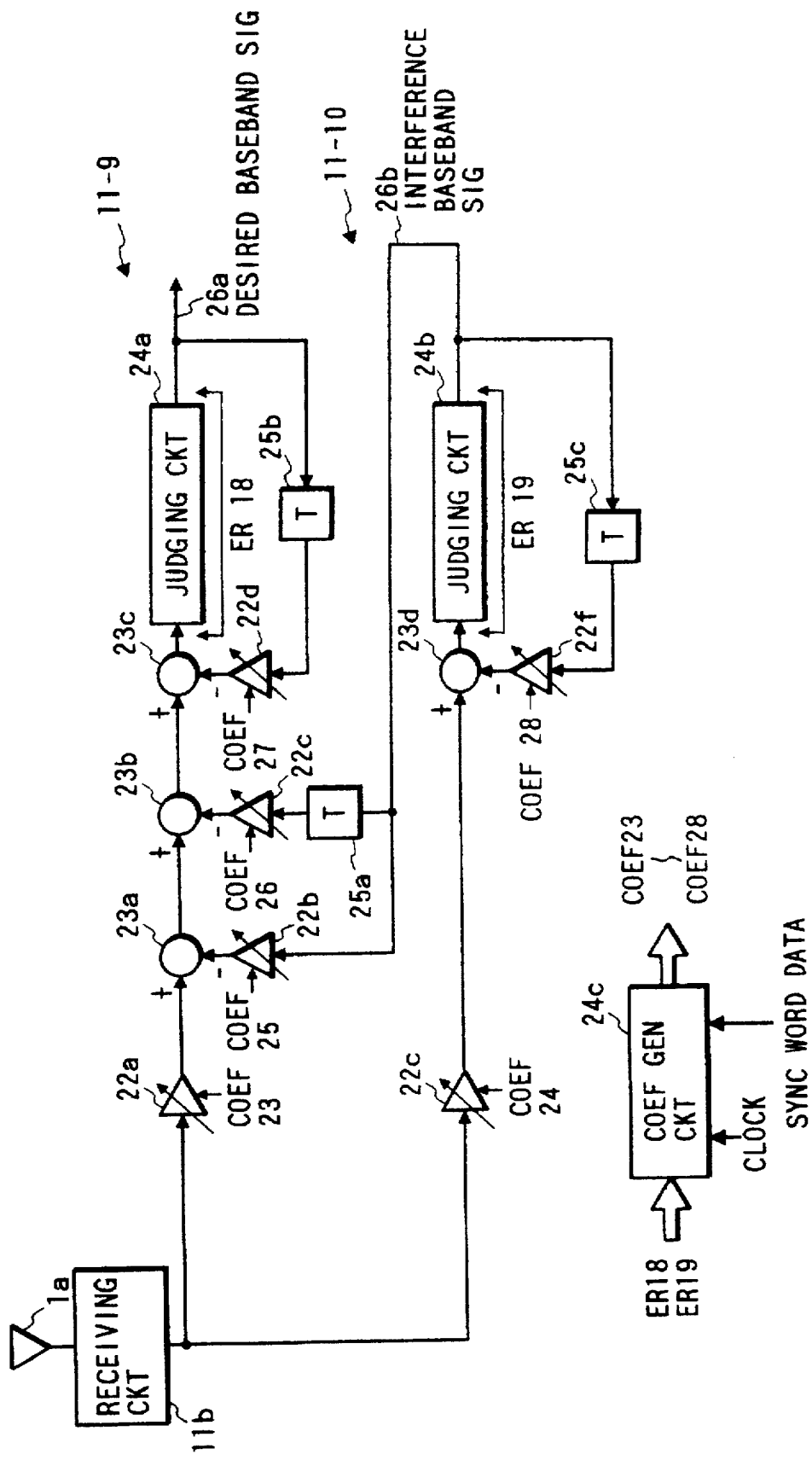
FIG. 5 is a block diagram of a data receiving apparatus of a fifth embodiment.

FIG. 5 is a block diagram of a data receiving apparatus of the fifth embodiment. The data receiving apparatus of the fifth embodiment comprises an antenna 1a for receiving a radio wave signal including a desired radio wave signal including a baseband signal and an interference radio wave signal including an interference baseband signal, a receiving circuit 11b for receiving the radio wave signal received by the antenna 1a and outputting a baseband signal, a weighting circuit 22a for weighting the baseband signal from the receiving circuit 1b with a coefficient coef23, a weighting circuit 22c for weighting the baseband signal from the receiving circuit 1b with a coefficient coef24, an adder 23d, a judging circuit 24b for judging a value of an output of the adder 23d to reproduce an interference signal 26b, a delay 25c for delaying the interference signal 26b by an interval T, a weighting circuit 22f for weighting an output of the delay 25c with a coefficient coef28, the adder 23d subtracting an output of the weighting circuit 22f from the output of the weighting circuit 22c to remove a delayed component of the interference signal in the baseband signal, a weighting circuit 22b for weighting an output of the judging circuit 24b with a coefficient coef25, an adder 23a for summing an output of the weighting circuit 22a and an output of the weighting circuit 22b, a delay 25a for delaying the interference signal 26b by an interval T, a weighting circuit 22c for weighting an output of the delay 25a with coefficient coef26, the adder 23b for subtracting an output of the weighting circuit 22c from the output of the adder 23a to remove a delayed component of the interference signal in the output of the weighting circuit 22a, an adder 23c, a judging circuit 4a for judging a value of an output of the adder 23c to reproduce the desired signal 26a, a delay 25b for delaying the desired signal 26a by the interval T, a weighting circuit 22d for weighting an output of the delay 25b with a coefficient coef22, the adder 23c subtracting an output of the weighting circuit 22d from the output of the adder 23b to remove a delayed component of the desired signal in the output of the adder 23b, and a coefficient generation circuit 24c generates coefficients coef23 to coef28 from the error ER18 and ER19, and the synchronizing word data.

A basic operation of the fifth embodiment is similar to the first embodiment. However, in this embodiment, a delayed components of the desired baseband signal 26a and the interference baseband signal 26b are suppressed.

Figure 6:
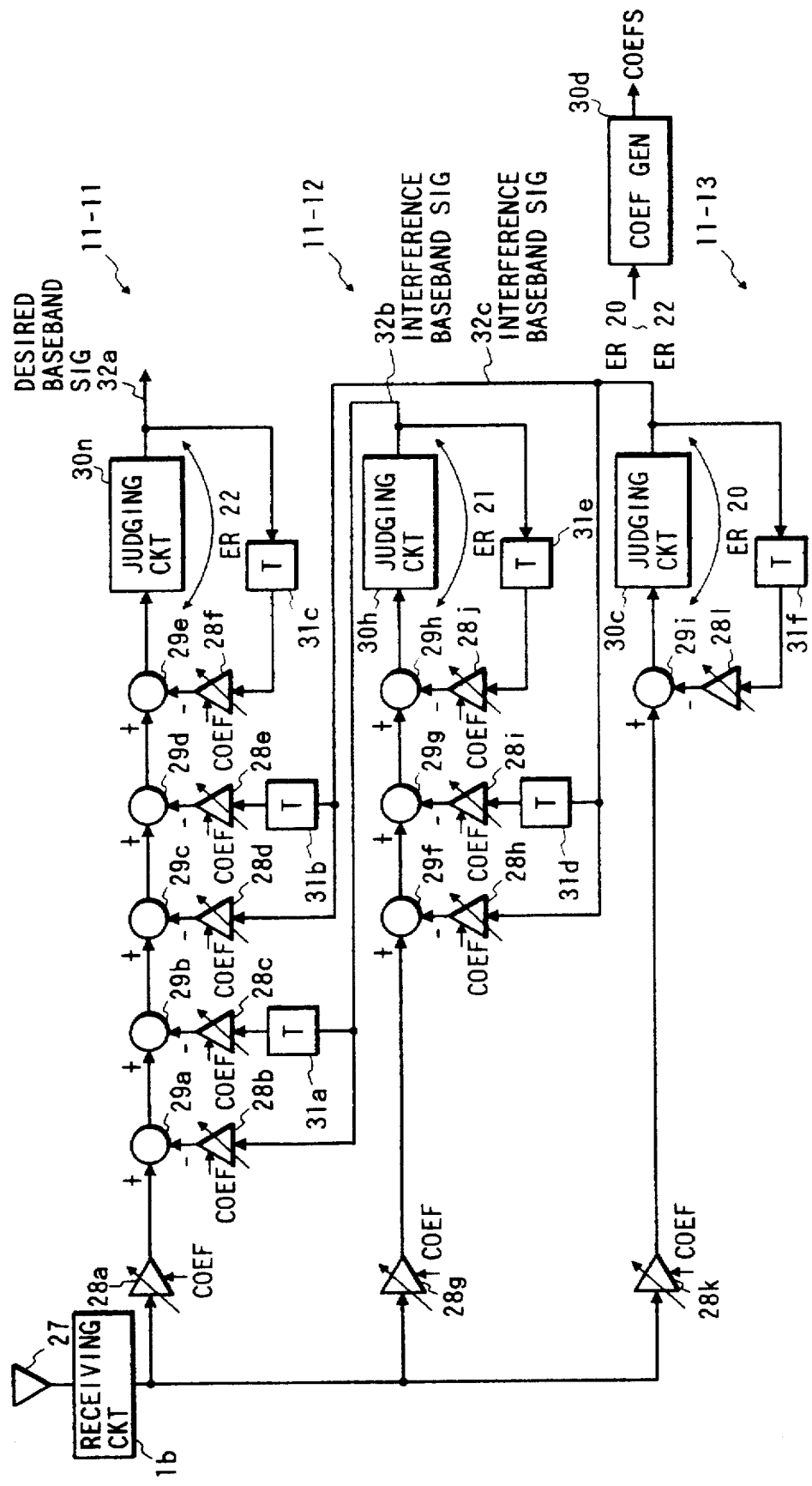
FIG. 6 is a block diagram of a data receiving apparatus of a sixth embodiment.

A sixth embodiment will be described. FIG. 6 is a block diagram of a data receiving apparatus of the sixth embodiment.

In the fifth embodiment, there is only one interference signal to be suppressed. However, in this sixth embodiment, there is two interference baseband signal received by the antenna 1a to be suppressed with delayed component suppressed. Therefore, equalizers 11-12 and 11-13 for detecting interference baseband signals 32b and 32c are provided. Components of the interference baseband signals in the equalizer 11-11 are suppressed as similar to the fifth embodiment. Moreover, these interference basebands 11-12 and the 11-13 are equalized with delayed components and the desired baseband are equalized with delayed components suppressed as similar to the fifth embodiment.

In this embodiment, there are two interference radio wave signals received by the antenna 1a. However, if the number of the interference radio wave signals received by the antenna 1a is more than two, additional circuit(s) can be provided to suppress the interference baseband signals. Therefore, if there is n interference radio wave signals received by the antenna 1a, n+1 equalizers including the first equalizer 11-1 should be provided, wherein n is a natural number.

A seventh embodiment will be described.

Figure 7:
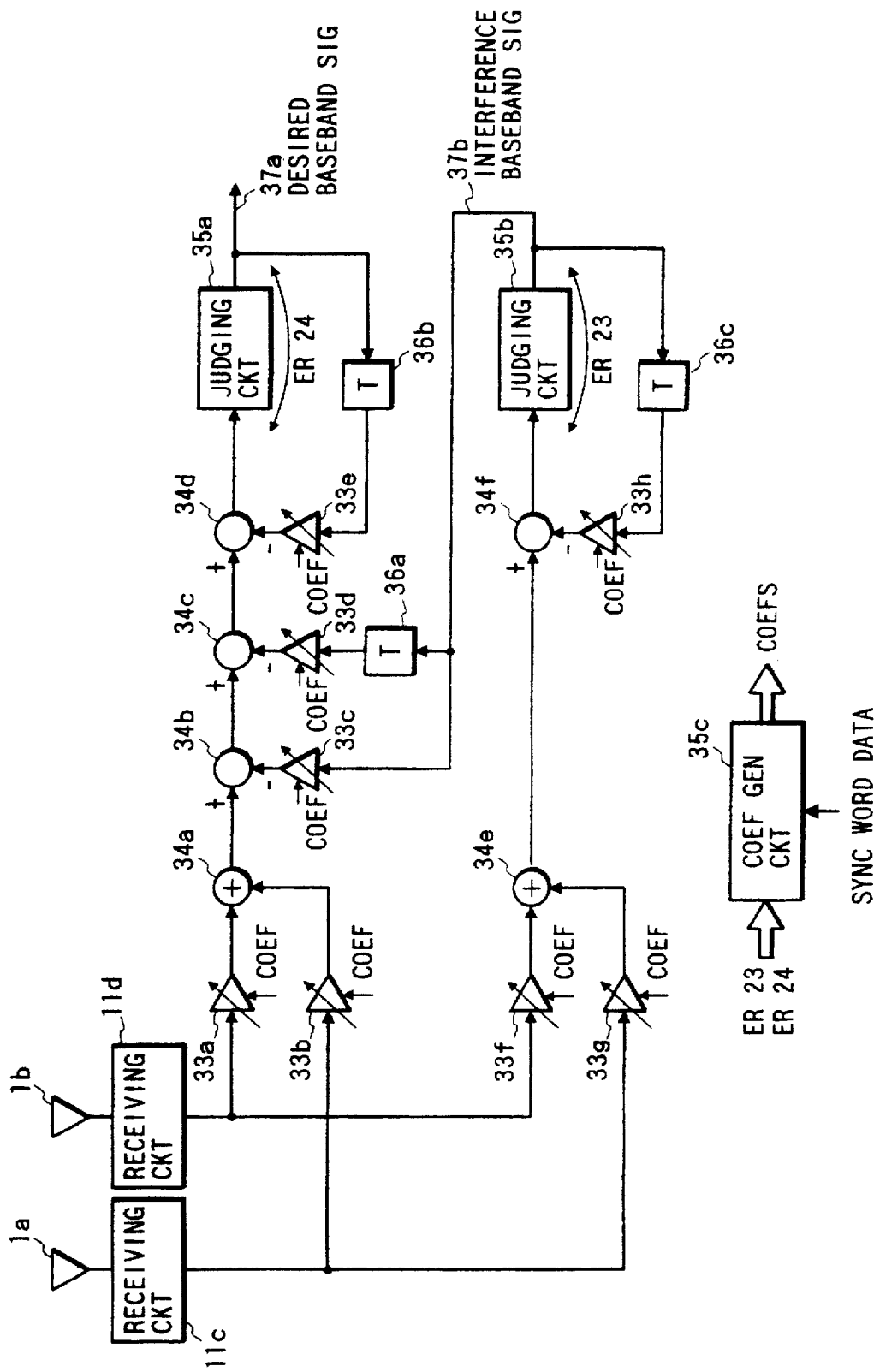
FIG. 7 is a block diagram of a data receiving apparatus of a seventh embodiment.

FIG. 7 is a block diagram of a data receiving apparatus of the seventh embodiment.

A basic structure of the seventh embodiment is similar to the third embodiment. However, in this embodiment, delayed components of the desired baseband signal 26a and the interference baseband signal 26b are suppressed. That is, a delay circuit 36c, a weighting circuit 33h, an adder 34f, a delay circuit 36b, a weighting circuit 33e, an adder 34d, a delay circuit 36a, a weighting circuit 33d, and an adder 34c are provided in addition to the structure of the third embodiment. The basic operation is similar to the third embodiment. However, in this embodiment, a delayed components of the desired baseband signal 26a and the interference baseband signal 26b are suppressed as similar to the fifth embodiment.

An eighth embodiment will be described.

Figure 8:
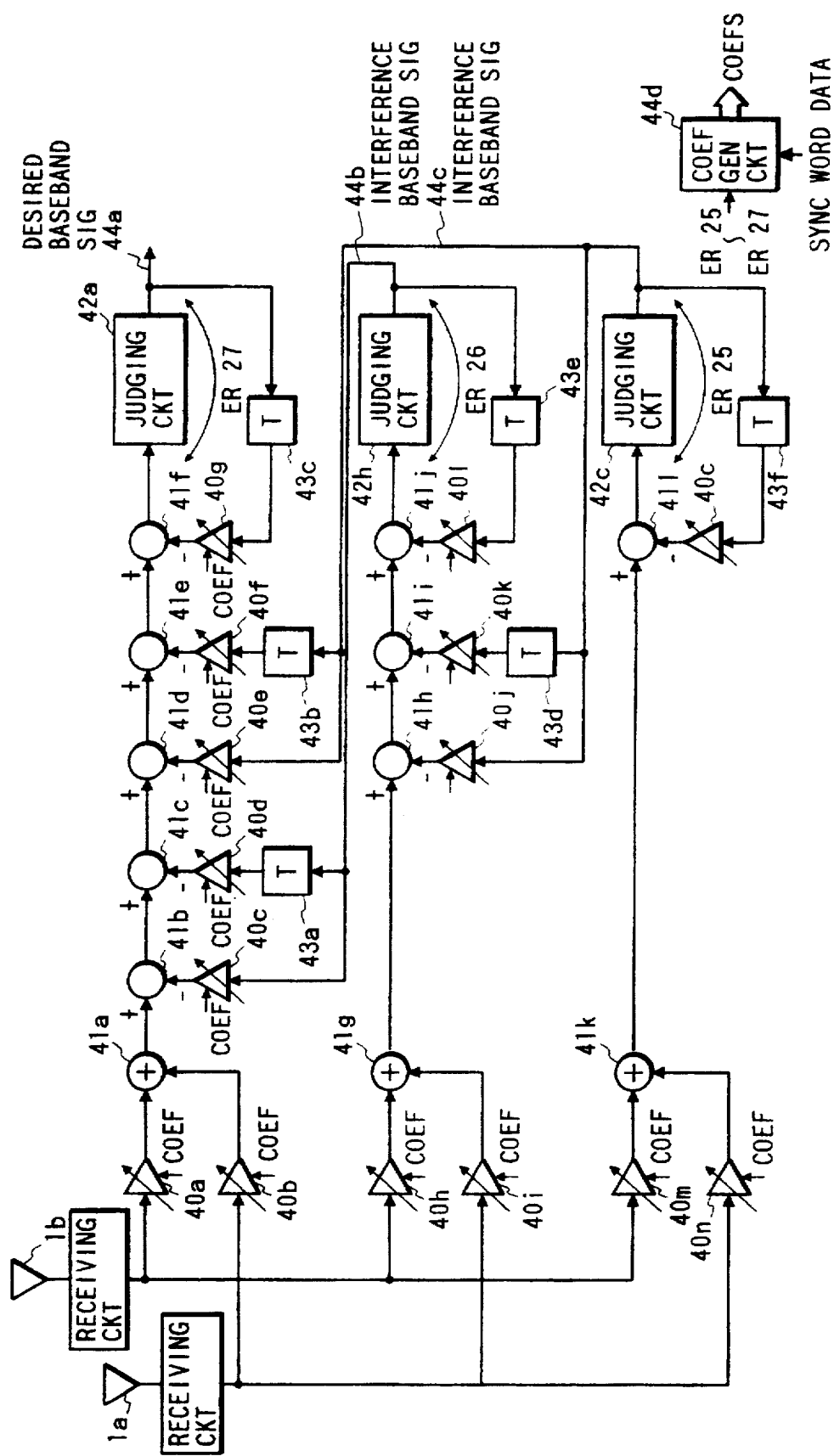
FIG. 8 is a block diagram of a data receiving apparatus of an eighth embodiment.

FIG. 8 is a block diagram of a data receiving apparatus of the eighth embodiment. In the seventh embodiment, there are two interference baseband signals received by the antennas 1a and 1b. However, in the eighth embodiment, two interference radio wave signals are received by the antennas 1a and 1b. Then, the data receiving apparatus of the eighth embodiment detects the desired baseband signal with two interference baseband signals are suppressed. Moreover as similar to the seventh embodiment, delayed components of interference baseband signals and the desired baseband signal are suppressed.

A ninth embodiment will be described.

FIG. 9A is a block diagram of a data receiving apparatus of the ninth embodiment. The data receiving apparatus of the ninth embodiment comprises an antenna 1a for receiving a radio wave signal including a desired baseband signal and an interference baseband signal, a receiving circuit 1b for receiving the radio wave signal from the antenna 1a and outputting a baseband signal including the desired baseband signal and the interference baseband signal, an equalizer 146 for equalizing the baseband signal from the receiving circuit 1b, an equalizer 147 for equalizing the received radio wave signal from the antenna 1a, a judging circuit 49b for judging a value of an output of the equalizer 147 to reproduce an interference signal, a weighting circuit 46b for weighting an output of the judging circuit 49b, an adder 48b for adding an output of the equalizer 146 and an output of the weighting circuit 46b, and a judging circuit 49a for judging a value of an output of the adder 48b to reproduce the desired signal 50a.

The equalizer 146 comprises delay circuits 47a, 47b, and 47c for successively delaying the received radio wave signal by an interval T/2 respectively, and weighting circuits 46a-1 to 46a-4 for weighting the baseband signal and outputs of the delay circuits 47a-1 to 47a-4 respectively, and adder 48a for summing outputs of the weighting circuits 46a-1 to 46a-4. The coefficient generation circuit 50c generates coefficients supplied to weighting circuits.

The equalizer 147 comprises delay circuits 47d, 47e, and 47f for successively delaying the received radio wave signal by an interval T/2 respectively, and weighting circuits 46c-1 to 46c-4 for weighting the baseband signal and outputs of the delay circuits 47a-1 to 47a-4 respectively, and adder 48c for summing outputs of the weighting circuits 46c-1 to 46c-4

The coefficient generation circuit 50c detects an error ER25 between the output of the adder 48c and the output of the judging circuit 49b and generates coefficients supplied to the weighting circuits 46c-1 to 46c-4 to reproduce the interference baseband signal 50b.

Also, the coefficient generation circuit 50c detects an error ER26 between the output of the adder 48b and the output of the judging circuit 49a and generates coefficients supplied to the weighting circuits 46a-1 to 46a-4 to reproduce the desired baseband signal 50a. Moreover, the coefficient generation circuit 50c generates a coefficient supplied to the weighting circuit 46b to suppress a component of the interference baseband signal 50b at the output of the adder 48b.

An operation of this embodiment will be described.

Figure 9B:
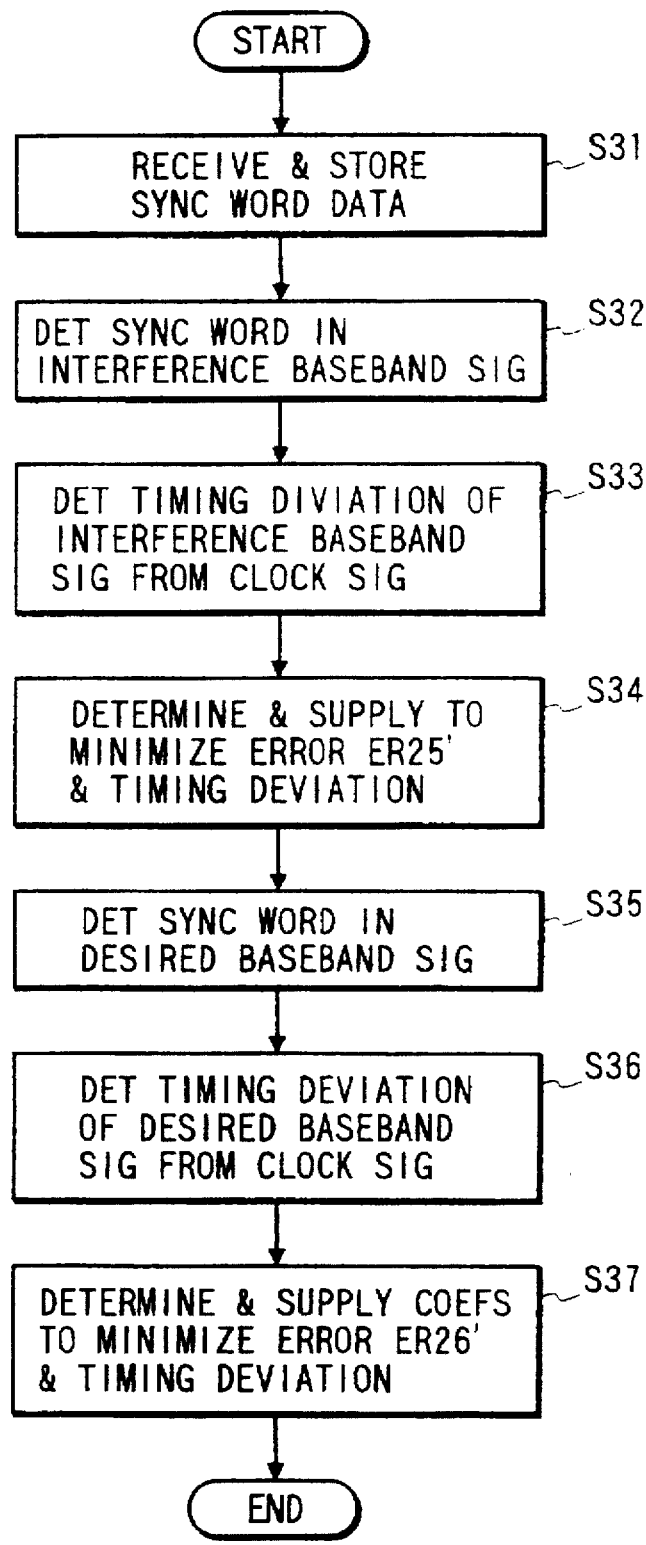
FIG. 9B are a diagram of a flow chart of the ninth embodiment.

FIG. 9B are a diagram of a flow chart of the ninth embodiment.

For example, it is assumed that two different radio wave signals are received by the antenna 1a and are received at different timings by an interval T corresponding to a symbol rate of these radio wave signals. The coefficient generation circuit 50c generates the coefficients of the equalizer 147 as follows:

The coefficient generation circuit 50c receives and stores synchronizing word data corresponding to the synchronizing word in the desired baseband signal in step s31. The coefficient generation circuit s31 detects the synchronizing word in the interference baseband signal in step s32, and detects a timing deviation of the interference baseband signal from a clock signal in step s33. The coefficient generation circuit 50c generates coefficients such that the error ER25 between an output of the adder 48c and the output of the judging circuit 49b and the timing deviation are minimized.

The coefficient generation circuit 50c detects the synchronizing word in the desired baseband signal in step s35, that is, a synchronizing word corresponds to the synchronizing word data. In the following step s36, the coefficient generation circuit 50c detects a timing deviation of the desired baseband signal from the clock signal. That is, the coefficient generation circuit 50c detects timing deviation of a synchronizing data pattern in the detected synchronizing word from the clock signal of this data receiving apparatus. Then, the coefficient generation circuit 50c generates coefficients such that the error ER26 between an output of the adder 48b and the output of the judging circuit 49a and the timing deviation are minimized and a suitable coefficient for the weighting circuit 46 when the equalizer 147 detects the interference baseband. When the equalizer 147 detects the desired baseband signal, the output of the weighting circuit 46b is minimized. Therefore, the adder 48b cancels the interference baseband signal in the output of the adder 48a.

Therefore, the data receiving apparatus of this embodiment can cancel the interference baseband signal though timings of the desired baseband signal and the interference baseband signal are different.

In this embodiment, the timing deviation is assumed to be the interval T corresponding to the symbol rate. However, the deviation more than T can be cancelled by modification of the equalizers 146 and 147.

Figure 10:
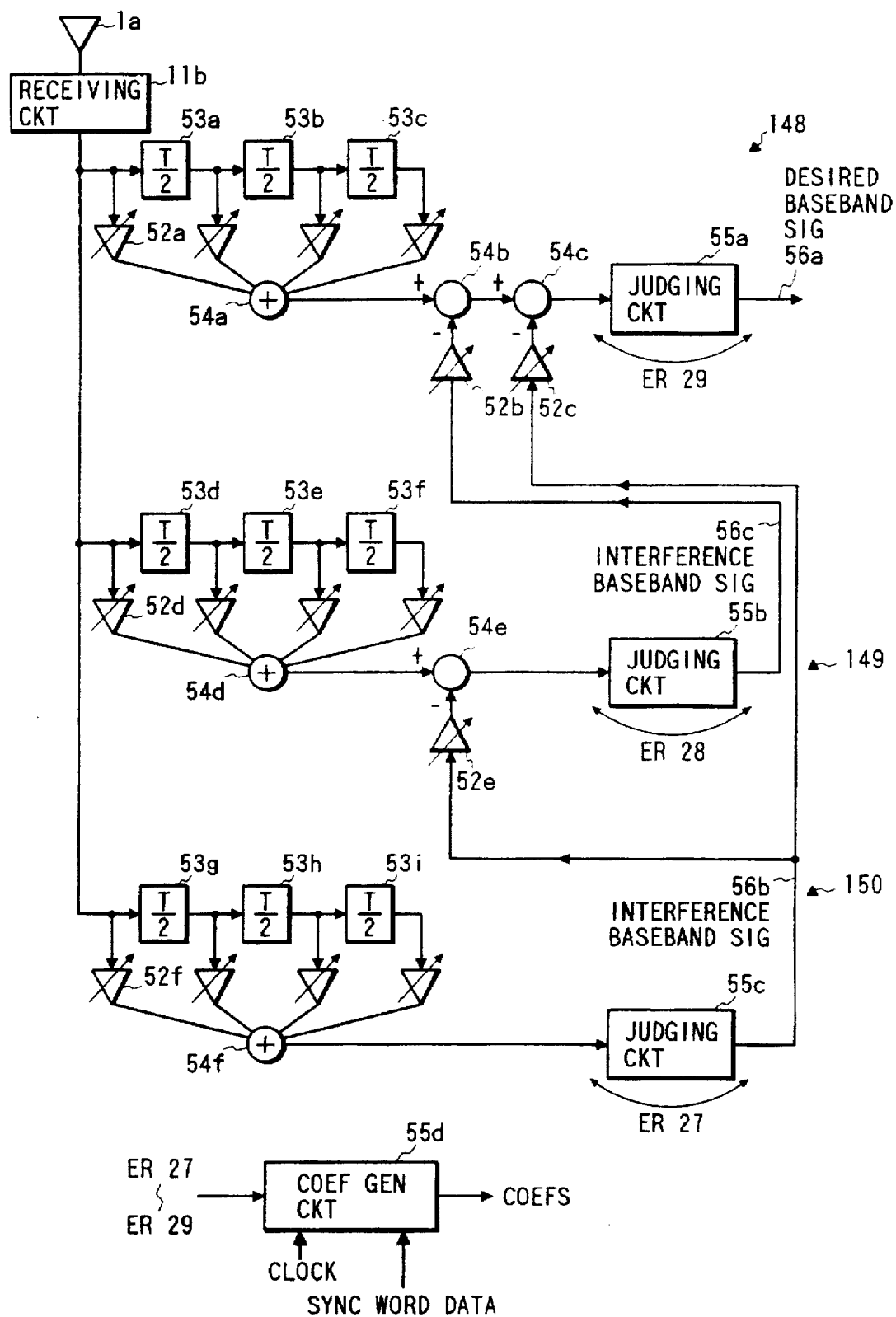
FIG. 10 is a block diagram of a data receiving apparatus of a tenth embodiment.

A tenth embodiment will be described. FIG. 10 is a block diagram of a data receiving apparatus of the tenth embodiment.

In this embodiment, the antenna 1a receives two radio wave signals in addition to the interference signal. An intensity of an interference radio wave signal including an interference baseband signal 56b is largest, an intensity of an interference radio wave signal including an interference baseband signal 56c is secondly largest and an intensity of an desired radio wave signal including the desired baseband signal 56a is third largest.

The data receiving apparatus of the tenth embodiment suppress interference baseband signals received by the antenna 1a as similar to the ninth embodiment.

That is, the equalizer 150 detects the interference baseband signal 56b because the interference radio wave including the interference baseband signal 56b has a largest intensity at the antenna 1a. The weighting circuit 52 and the adder 54e suppress a component of the interference baseband signal 56b in the output of the adder 54d, so that the judging circuit 55b detects the interference baseband signal 56c. The weighting circuits 52b and 52c and the adders 54b and 54c suppress components of the interference baseband signals 56b and 56c in the output of the adder 54. Therefore, the judging circuit 55a can detects the desired baseband signal.

In this embodiment, the number of the interference radio signals is two. However, if more than two interference radio signals are received by the antenna 1b, the desired baseband signal can be detected by adding an equalizer to this structure and adding an weighting circuit and an adder as similar to the weighing circuits 52c and the adder 54c.

An eleventh embodiment will be described.

Figure 11:
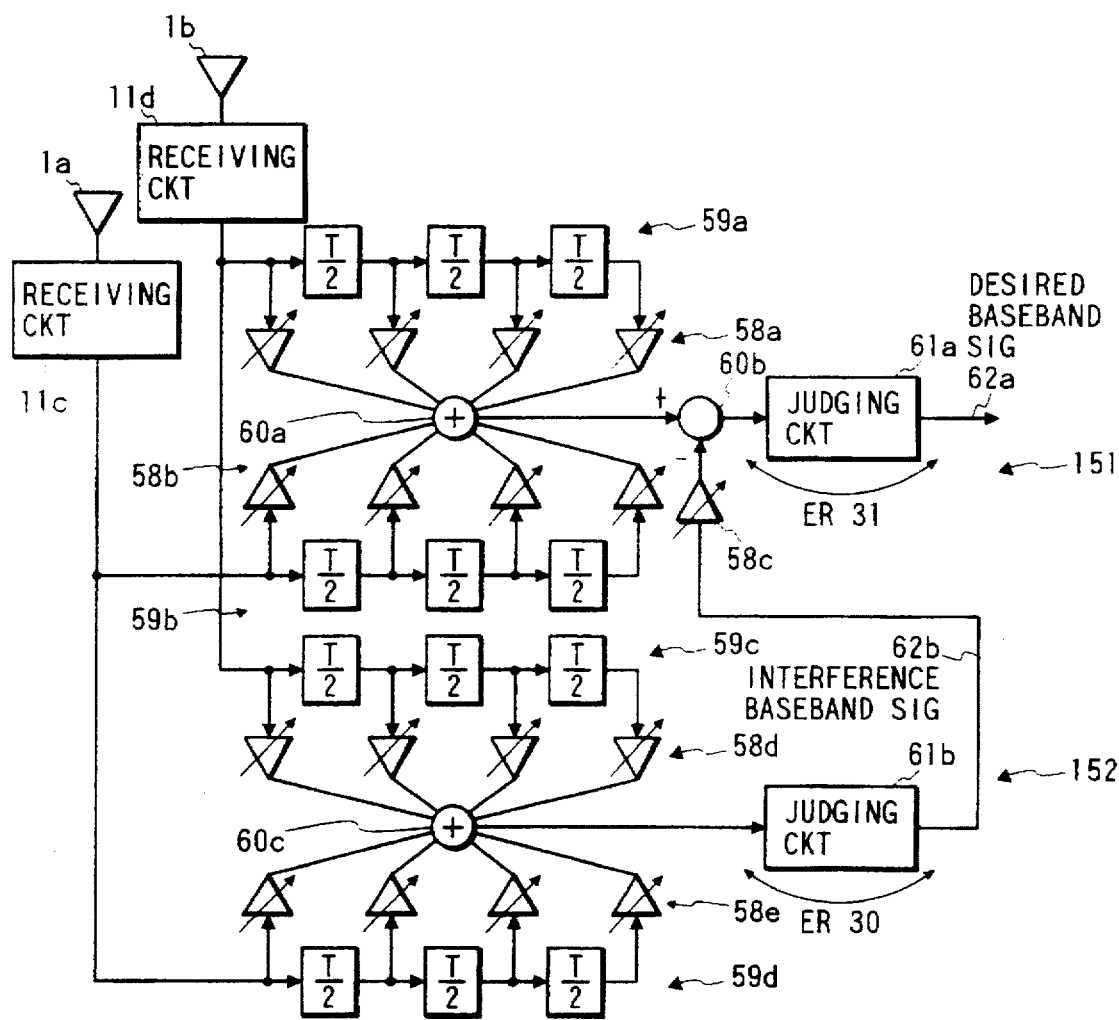
FIG. 11 is a block diagram of a data receiving apparatus of an eleventh embodiment.
Figure 11:
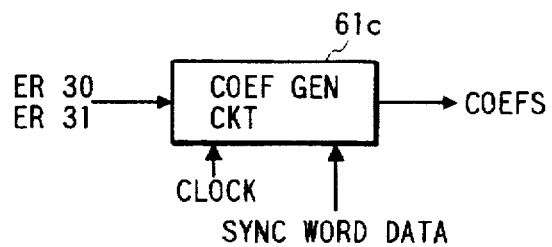

FIG. 11 is a block diagram of a data receiving apparatus of the eleventh embodiment.

The basic structure and operation are similar to the third embodiment shown in FIG. 3. That is, the weighting circuit 12a in FIG. 3 is replaced by delay circuit 59a and weighting circuit 58a, the weighting circuit 12b in FIG. 3 is replaced by delay circuit 59b and weighting circuit 58b, and the adder 13a is replaced by the adder 60a. Similarly, the weighting circuit 12d in FIG. 3 is replaced by delay circuit 59c and weighting circuit 58d, the weighting circuit 12e in FIG. 3 is replaced by delay circuit 59d and weighting circuit 58e, and the adder 13a is replaced by the adder 60c. The judging circuit 61b detects the interference signal 62b as similar to the third embodiment. That is, the coefficient generation circuit 61c generates coefficient for the weighting circuits 58d and 58e to equalize the baseband signal including the synchronizing word having a data pattern not corresponding to the synchronizing word data with a timing deviation of the clock signal from the inference baseband signal. A weighting circuit 58c corresponding to the weighting circuit 12c in FIG. 3 suppresses the component of the interference based signal in the adder 60a, so that the judging circuit 61a can detects the desired baseband signal. In this embodiment, the timing of the interference radio wave signal deviates from the desired radio wave signal at the antenna 1a and 1b by T (symbol rate), these timings can be adjusted by weighting conditions of the weighting circuits 58a, 59b, 58d, and 59d.

A twelfth embodiment will be described.

Figure 12:
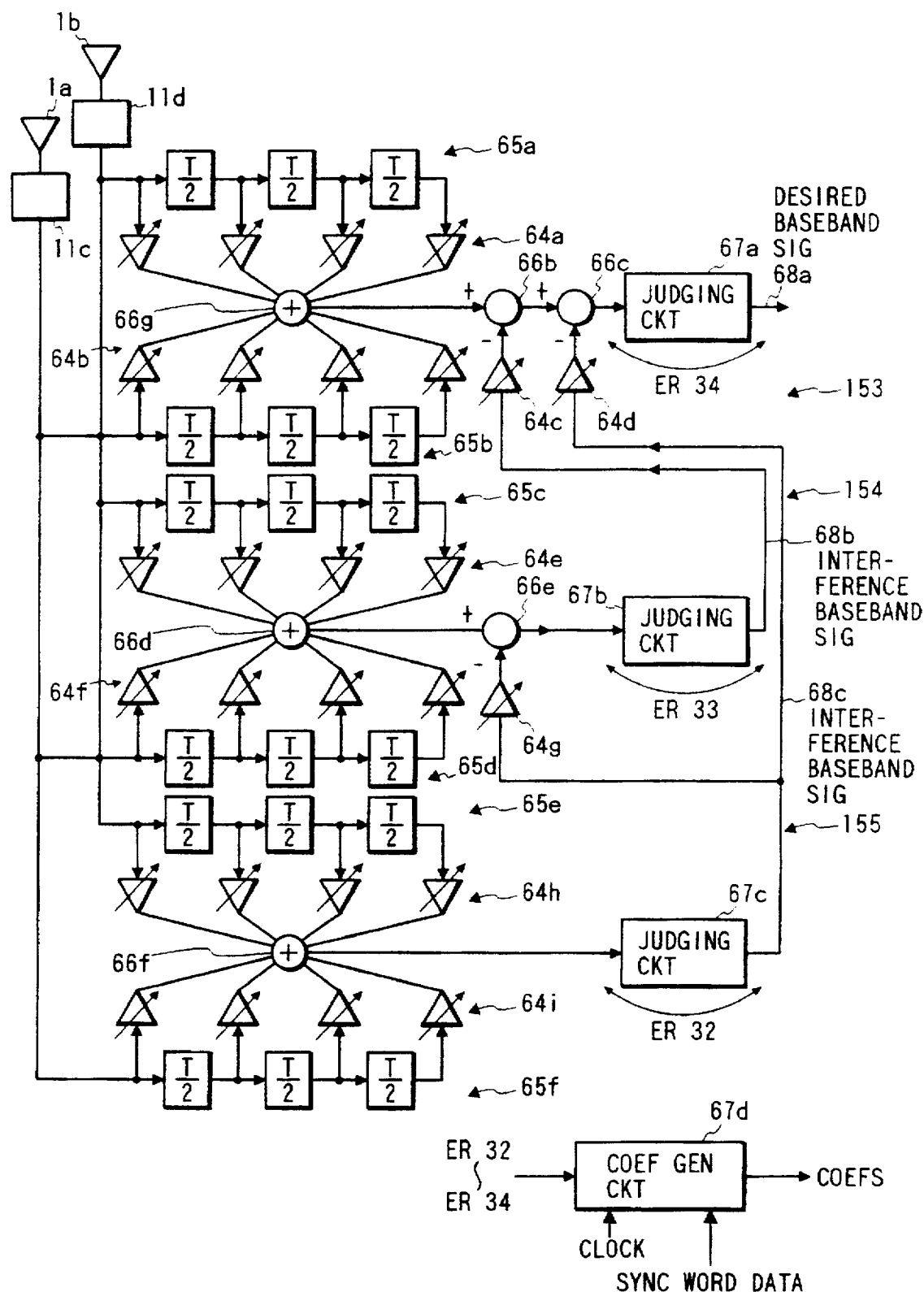
FIG. 12 is a block diagram of a data receiving apparatus of a twelfth embodiment.

FIG. 12 is a block diagram of a data receiving apparatus of the twelfth embodiment.

In this embodiment, the antennas 1a and 1b receive two interference radio wave signals in addition to the desired radio wave signal. An intensity of a first interference radio wave signal including an interference baseband signal 68c is largest, an intensity of a second interference radio wave signal including an interference baseband signal 68c is secondly largest and an intensity of an desired radio wave signal including the desired baseband signal 56a is third largest.

The data receiving apparatus of the twelfth embodiment suppress first and second interference baseband signals received by the antennas 1a and 1b as similar to the eleventh embodiment. That is, the equalizer 155 detects the first interference baseband signal 68c because the interference radio wave including the interference baseband signal 68c has a largest intensity at the antennas 1a and 1b. The weighting circuits 64g and an adder 66e suppress a component of the first interference baseband signal 68c in the output of the adder 66d, so that the judging circuit 67b detects the interference baseband signal 68b. The weighting circuits 66b and 66c suppress components of the interference baseband signals 68b and 68c in the output of the adder 66g. Therefore, the judging circuit 67a can detects the desired baseband signal. Moreover, timings of the interference baseband signals and the desired baseband signal can be adjusted by weighting conditions of the weighting circuits as similar to the eleventh embodiment.

In this embodiment, the number of the interference radio signals is two. However, though more than two interference radio signals are received by the antennas 1a and 1b, the desired baseband signal can be detected by adding a similar equalizer to this structure and adding an weighting circuit and an adder as similar to the weighing circuits 64c and the adder 66b.

A thirteenth embodiment will be described.

Figure 13:
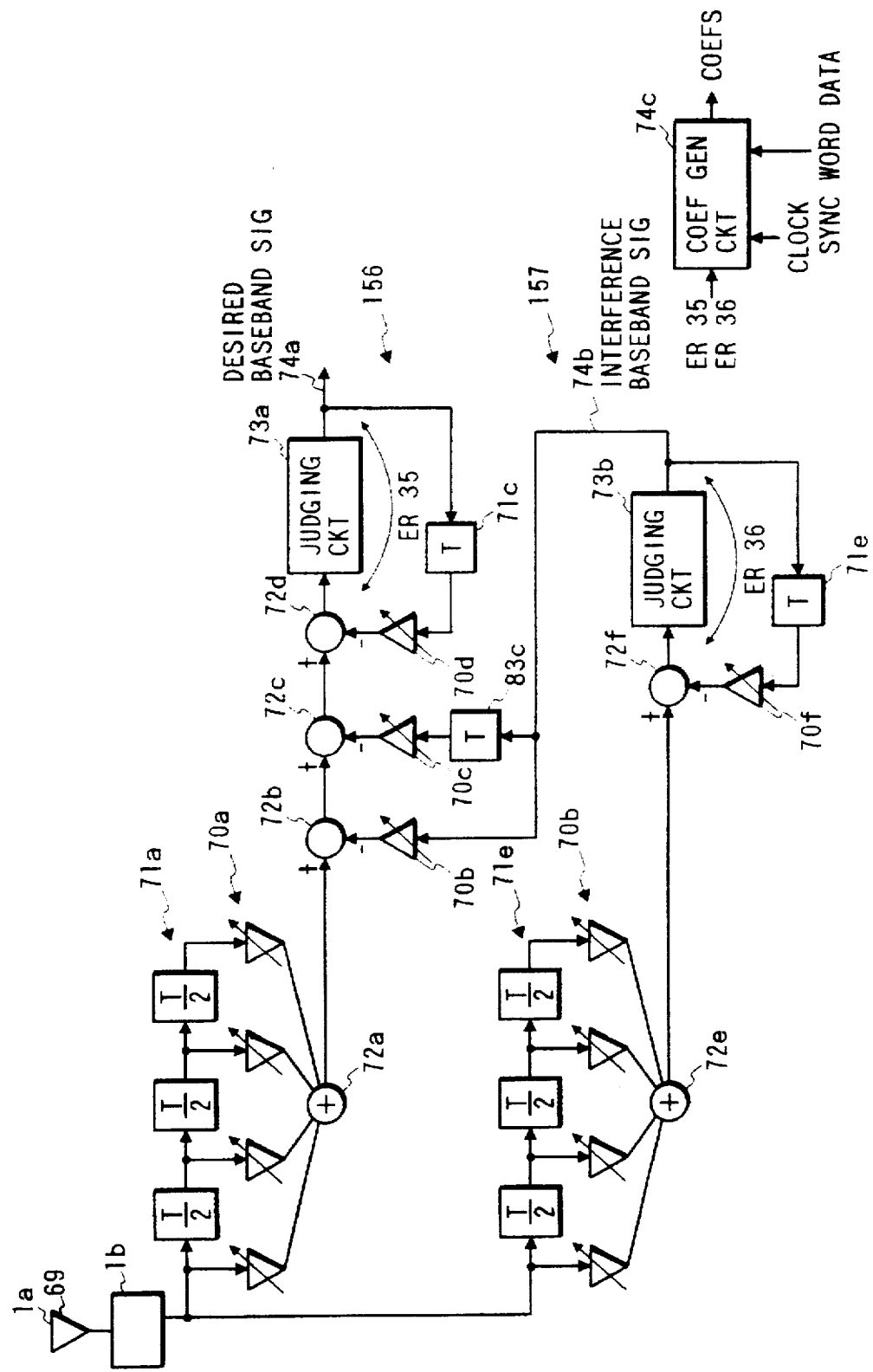
FIG. 13 is a block diagram of a data receiving apparatus of a thirteenth embodiment.

FIG. 13 is a block diagram of a data receiving apparatus of the thirteenth embodiment.

The basic structure and operation are similar to the fifth embodiment shown in FIG. 5. That is, the weighting circuit 22a in FIG. 5 is replaced by delay circuits 71a, weighting circuits 70a, and the adder 72a. Similarly, the weighting circuit 22c in FIG. 5 is replaced by delay circuits 71e, weighting circuits 70b, and the adder 72e. The judging circuit 73b detects the interference signal 74b as similar to the fifth embodiment. That is, the coefficient generation circuit 74c generates coefficients for the weighting circuits 70b and 70f to equalize the baseband signal including the synchronizing word having a data pattern not corresponding to the synchronizing word data with a timing deviation of the clock signal from the inference baseband signal. A weighting circuit 70b corresponding to the weighting circuit 22b in FIG. 5 suppresses the component of the interference based signal in the adder 72a, so that the judging circuit 73a can detect the desired baseband signal. In this embodiment, the timing of the interference radio wave signal deviates from the desired radio wave signal at the antenna 1a and 1b by T (symbol rate), these timings can be adjusted by weighting condition of the weighting circuits as similar to the eleventh embodiment. Moreover, as similar to the fifth embodiment, a delayed interference baseband signal can be suppressed by a delay 71e, a weighting circuit 70f, and adder 72f. Moreover, a delayed component of the interference baseband signal in the output of the adder 72b can be suppressed by a delay for delaying the interference baseband signal 74b and a weighting circuit 70c, and an adder 72c and a delayed desired baseband signal can be suppressed by a delay 71c for delaying the desired baseband signal 74a, a weighing circuit 70d and an adder 72d.

Figure 14:
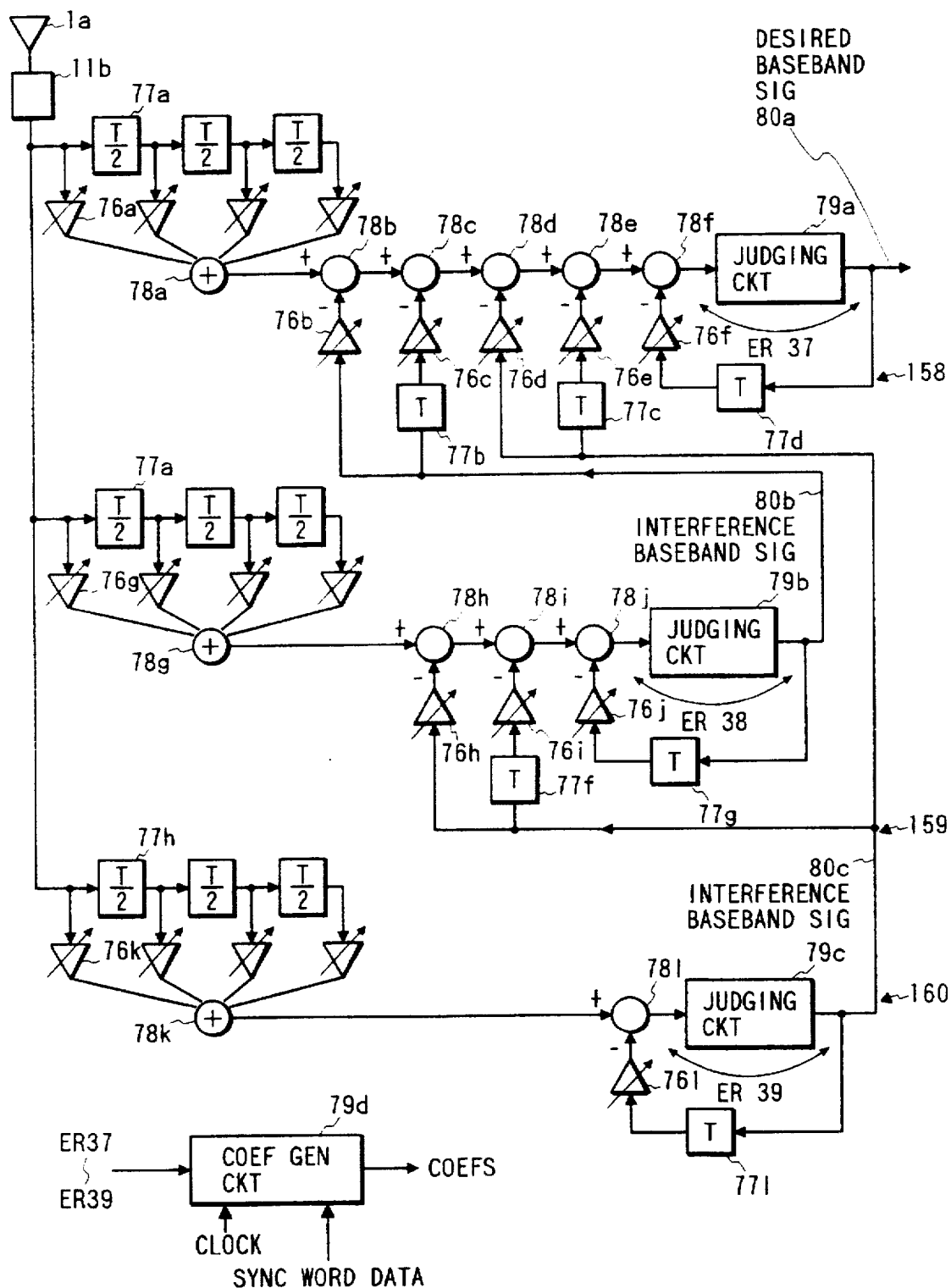
FIG. 14 is a block diagram of a data receiving apparatus of a fourteenth embodiment.

A fourteenth embodiment will be described. FIG. 14 is a block diagram of a data receiving apparatus of the fourteenth embodiment.

In this embodiment, the antenna 1a receives two interference radio wave signals in addition to the desired signal. An intensity of an interference radio wave signal including an interference baseband signal 80c is largest, an intensity of an interference radio wave signal including an interference baseband signal 80b is secondly largest and an intensity of an desired radio wave signal including the desired baseband signal 80a is third largest.

The data receiving apparatus of the fourteenth embodiment suppresses interference baseband signals received by the antenna 1a as similar to the thirteenth embodiment.

That is, the equalizer 160 detects the interference baseband signal 80c because the interference radio wave signal including the interference baseband signal 80c has a largest intensity at the antenna 1a. The weighting circuit 76h and the adder 78h suppress a component of the interference baseband signal 80c in the output of the adder 78g, so that the judging circuit 79b detects the interference baseband signal 80b. The weighting circuits 78b and 78d suppress components of the interference baseband signals 80b and 80c in the output of the adder 78a. Therefore, the judging circuit 79a can detects the desired baseband signal.

Moreover, as similar to the fifth embodiment, a delayed component of the interference baseband signal 80c in the output of the adder 78k can be suppressed by a delay 77l, a weighting circuit 76l, and adder 78l. Moreover, a delayed component of the interference baseband signal 80c in the output of the adder 78g can be suppressed by a delay 77f for delaying the interference baseband signal 80c and a weighting circuit 76i, and an adder 78i and a delayed component of the desired baseband signal 80a in the output of the adder 78a can be suppressed by a delay 77d for delaying the desired baseband signal 80a, a weighing circuit 76f and an adder 78f. Moreover, the delayed component of the interference baseband signal 80c in the output of the adder 78a can be suppressed by a delay 77c, a weighting circuit 76e, and adder 78e and the delayed component of the interference baseband signal 80b in the output of the adder 78a can be suppressed by a delay 77b for delaying the interference baseband signal 80b and a weighting circuit 76c, and an adder 78c.

In this embodiment, the number of the interference radio signals is two. However, if more than two interference radio signals are received by the antenna 1b, the desired baseband signal can be detected by adding an equalizer to this structure and adding an weighting circuit and adder as similar to the weighing circuits 76b and the adder 78b.

A fifteenth embodiment will be described.

Figure 15:
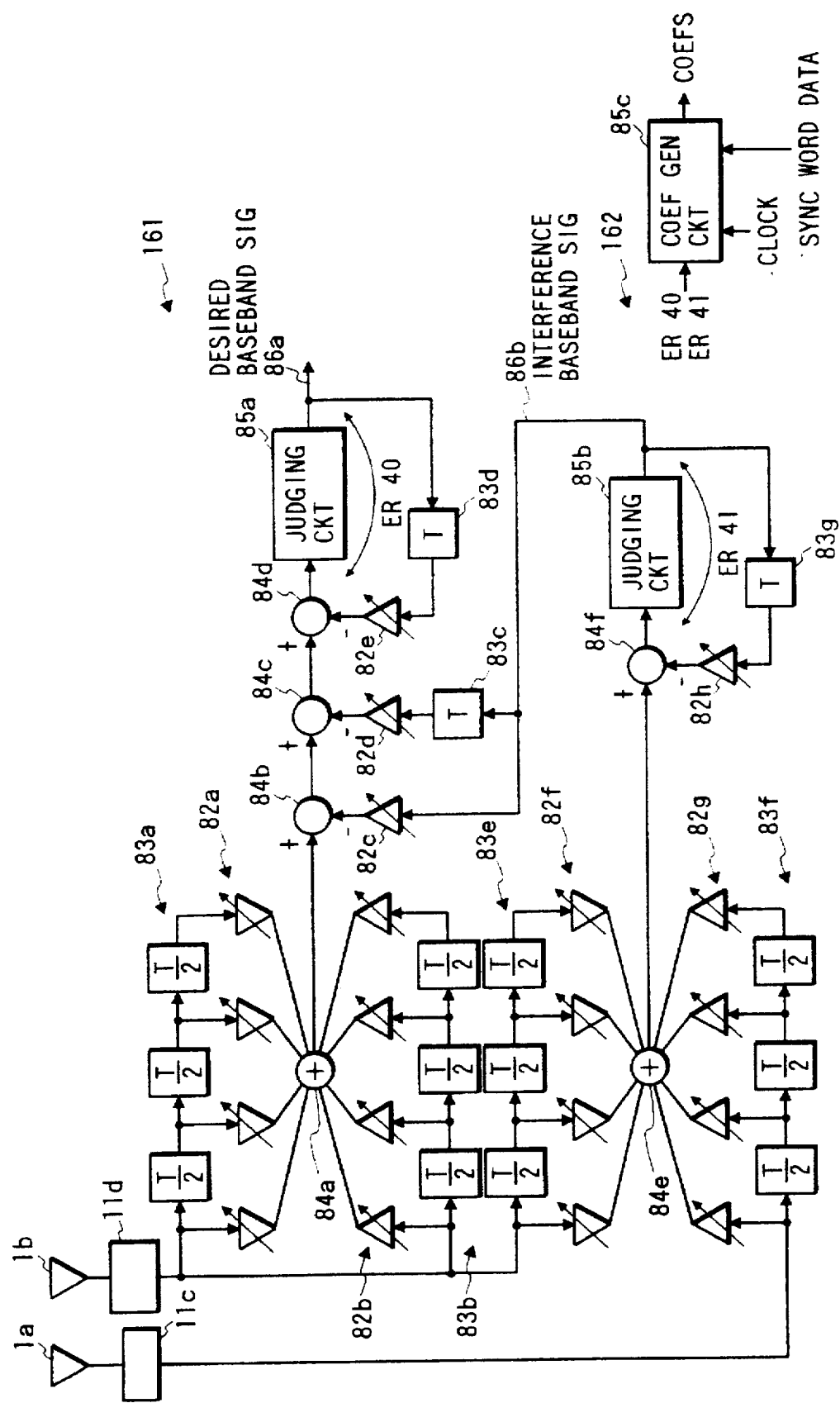
FIG. 15 is a block diagram of a data receiving apparatus of a fifteenth embodiment.

FIG. 15 is a block diagram of a data receiving apparatus of the fifteenth embodiment.

The basic structure and operation are similar to the seventh embodiment shown in FIG. 7. That is, the weighting circuit 33a in FIG. 7 is replaced by delay circuits 83a and weighting circuits 82a, the weighting circuit 33b in FIG. 7 is replaced by delay circuits 83b and weighting circuit 82b, and the adder 34a is replaced by the adder 84a. Similarly, the weighting circuit 33f in FIG. 7 is replaced by delay circuits 83e and weighting circuits 82f, the weighting circuit 33g in FIG. 7 is replaced by delay circuits 83f and weighting circuits 82g, and the adder 34e is replaced by the adder 84e. The judging circuit 85b detects the interference signal 86b as similar to the seventh embodiment. That is, the coefficient generation circuit 85c generates coefficients for the weighting circuits 82f and 82g to equalize the baseband signal including the synchronizing word having a data pattern not corresponding, i.e., the interference baseband signal 86b to the synchronizing word data with a timing deviation of the clock signal from the inference baseband signal. A weighting circuit 82c corresponding to the weighting circuit 33c in FIG. 7 suppresses the component of the interference based signal 86b in the output of the adder 84a, so that the judging circuit 85a can detects the desired baseband signal 86a. In this embodiment, the timing of the interference radio wave signal deviates from the desired radio wave signal at the antenna 1a and 1b by T (symbol rate), these timings can be adjusted by the delay circuits 83e and the weighting circuits 82f, delay circuits 83f and weighting circuits 82g with coefficients generated by the coefficient generation circuit 85c as similar to the eleventh embodiment. Moreover, the timing of the desired radio wave signal deviates from the desired radio wave signal at the antenna 1a and 1b by T (symbol rate), these timings can be adjusted by the delay circuits 83a and the weighting circuits 82a, delay circuits 83b and weighting circuits 82b with coefficients generated by the coefficient generation circuit 85c as similar to the eleventh embodiment.

In addition, as similar to the seventh embodiment, a delayed component of the interference baseband signal 86b in the output of the adder 84e can be suppressed by a delay 83g, a weighting circuit 82h, and an adder 84f. Moreover, a delayed component of the interference baseband signal 86b in the output of the adder 84a is suppressed by a delay 83c for delaying the interference baseband signal 86b and a weighting circuit 82d, and an adder 84c and a delayed component of the desired baseband signal 86a in the output of the adder 84a is suppressed by a delay 83d for delaying the desired baseband signal 86a, a weighing circuit 82e and an adder 84d.

Figure 16:
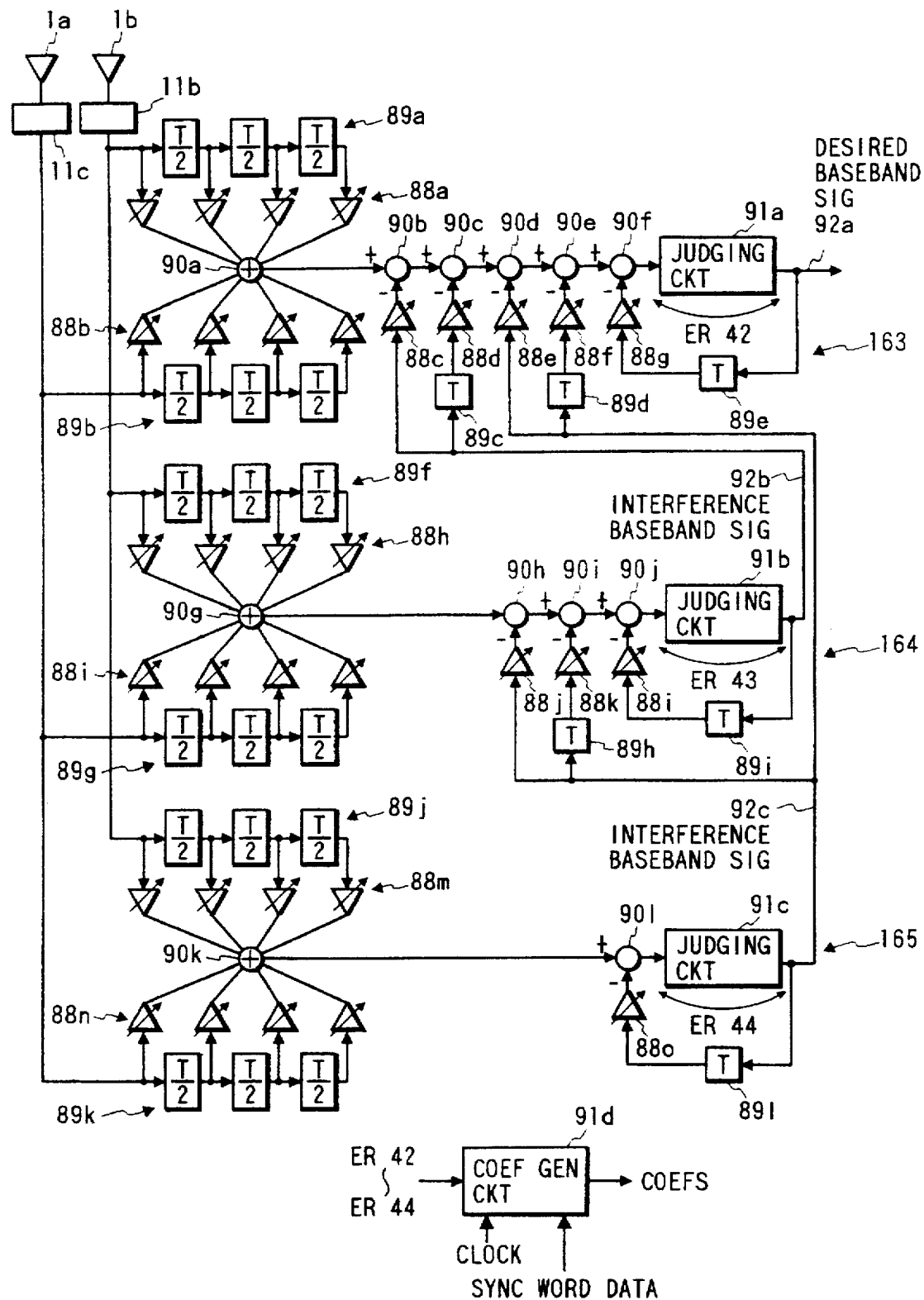
FIG. 16 is a block diagram of a data receiving apparatus of the sixteenth embodiment.
Figure 17:
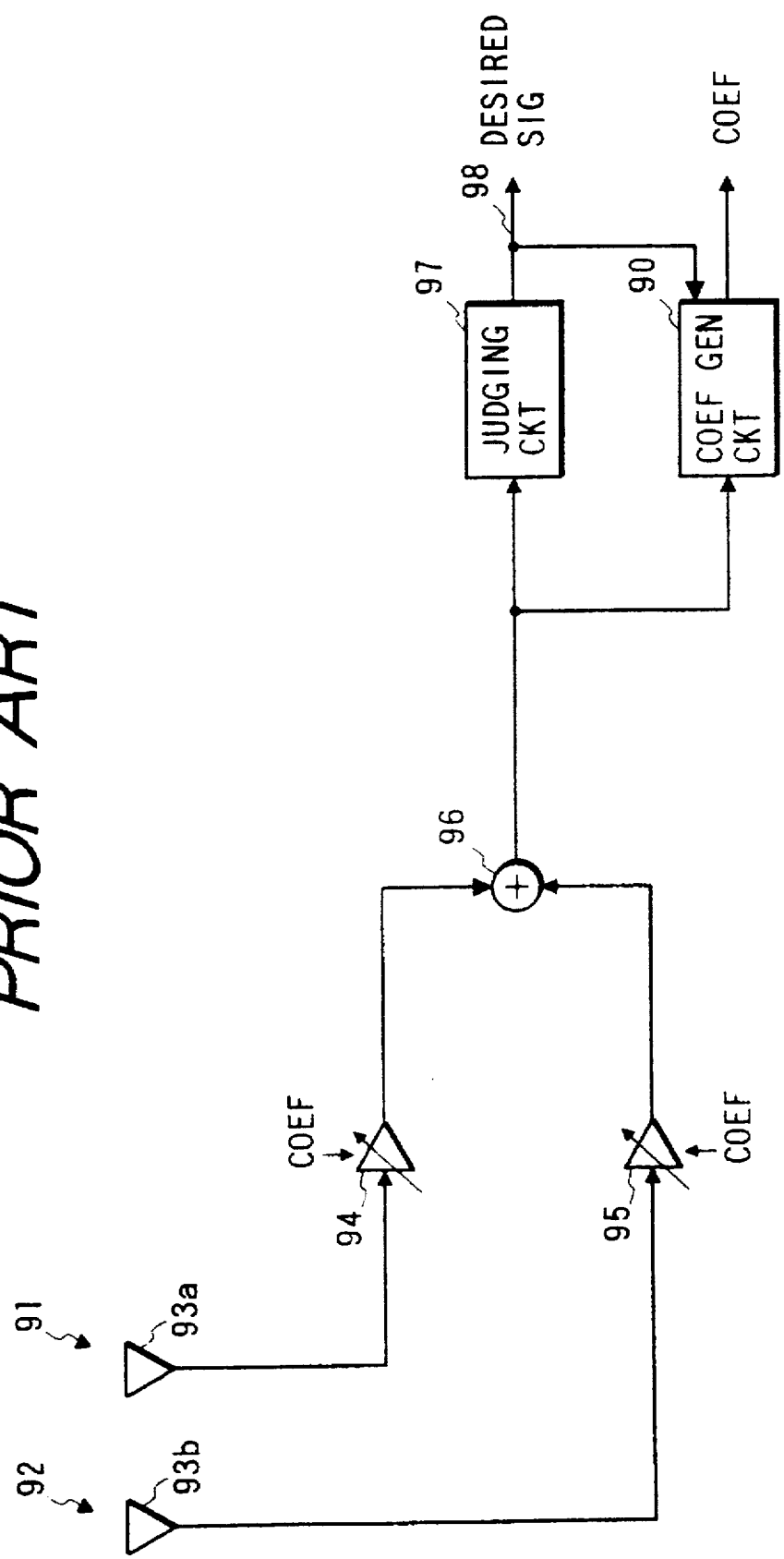
FIG. 17 is a prior art data receiving apparatus.

A sixteenth embodiment will be described. FIG. 16 is a block diagram of a data receiving apparatus of the sixteenth embodiment.

In this embodiment, the antennas 1a and 1b receive two interference radio wave signals in addition to the desired signal. An intensity of an interference radio wave signal including an interference baseband signal 92c is largest, an intensity of an interference radio wave signal including an interference baseband signal 92b is secondly largest and an intensity of an desired radio wave signal including the desired baseband signal 80a is third largest.

The data receiving apparatus of the sixteenth embodiment suppresses interference baseband signals received by the antennas 1a and 1b as similar to the fourteenth embodiment.

That is, the equalizer 165 detects the interference baseband signal 92c because the interference radio wave signal including the interference baseband signal 92c has a largest intensity at the antennas 1a and 1b. The weighting circuit 88j and the adder 90h suppress a component of the interference baseband signal 92c in the output of the adder 90g, so that the judging circuit 91b detects the interference baseband signal 92b. The weighting circuits 88c and 88e suppress components of the interference baseband signals 92b and 92c in the output of the adder 90a. Therefore, the judging circuit 91a can detect the desired baseband signal.

Moreover, as similar to the fifth embodiment, a delayed component of the interference baseband signal 92c in the output of the adder 90k can be suppressed by a delay 89l, a weighting circuit 88o, and an adder 90l. Moreover, a delayed component of the interference baseband signal 92c in the output of the adder 90g can be suppressed by a delay 89h for delaying the interference baseband signal 92c and a weighting circuit 88k, and an adder 90i. A delayed component of the interference baseband signal 92b in the output of the adder 90g can be suppressed by a delay 89i for delaying the interference baseband signal 92b and a weighting circuit 88i, and an adder 90j. A delayed component of the desired baseband signal 92a in the output of the adder 90a can be suppressed by a delay 89e for delaying the desired baseband signal 92a, a weighing circuit 88g and an adder 90f. Moreover, the delayed component of the interference baseband signal 92c in the output of the adder 90a can be suppressed by a delay 89c, a weighting circuit 88d, and adder 90c and the delayed component of the interference baseband signal 92b in the output of the adder 90a can be suppressed by a delay 89d for delaying the interference baseband signal 92b and a weighting circuit 88f, and an adder 90e.

In this embodiment, the number of the interference radio signals is two. However, if more than two interference radio signals are received by the antennas 1a and 1b, the desired baseband signal can be detected by adding an equalizer to this structure and adding an weighting circuit and adder as similar to the weighing circuits 88c and the adder 90b.

What is claimed is:

1. A data receiving apparatus comprising:
   receiving means for receiving a desired radio wave signal including a desired baseband signal and an interference radio wave signal including an interference baseband signal, said desired radio wave signal and said interference radio wave signal having substantially the same frequency;
   first weighting means for weighting an output of said receiving means with a first coefficient successively renewed such that said desired baseband signal is reproduced;
   subtracting means coupled to said first weighting means;
   first judging means coupled to said subtracting means;
   second weighting means for weighting said baseband signal with a second coefficient successively renewed such that said interference baseband signal is reproduced;
   second judging means coupled to said second weighting means; and
   supplying means for supplying an output of said second judging means to said subtracting means, said subtracting means effecting a subtraction between an output of said first weighting means and an output of said supplying means.

2. A data receiving apparatus as claimed in claim 1, further comprises removing means for removing delayed components in said desired baseband signal and said interference signal.

3. A data receiving apparatus as claimed in claim 1, further comprises compensation means for compensating a receiving timing of said received desired baseband signal and a receiving timing of said received interference baseband signal.

4. A data receiving apparatus as claimed in claim 1, further comprises removing means for removing delayed components in said desired baseband signal and said interference signal and compensation means for compensating a receiving timing of said received desired baseband signal and a receiving timing of said received interference baseband signal.

5. A data receiving apparatus as claimed in claim 1, wherein said receiving means comprises a plurality of antennas, said first weighting means comprises a plurality of first weighting circuits coupled to said plurality of antennas respectively and first summing means for summing outputs of said plurality of first weighting circuits and supplying a first result to said subtracting means, said second weighting means comprises a plurality of second weighting circuits coupled to said plurality of antennas respectively and second summing means for summing outputs of said plurality of second weighting circuits and supplying a second result to said second judging means.

6. A data receiving apparatus as claimed in claim 5, further comprises removing means for removing delayed components in said desired baseband signal and said interference signal.

7. A data receiving apparatus as claimed in claim 5, further comprises compensation means for compensating a receiving timing of said received desired baseband signal and a receiving timing of said received interference baseband signal.

8. A data receiving apparatus as claimed in claim 5, further comprises removing means for removing delayed components in said desired baseband signal and said interference signal and compensation means for compensating a receiving timing of said received desired baseband signal and a receiving timing of said received interference baseband signal.

9. A data receiving apparatus comprising:
receiving means for receiving a desired radio wave signal including a desired baseband signal and first to (N+1)th interference radio wave signals including first to (N+1)th interference baseband signals respectively to produce a baseband signal including the received desired baseband signal and the received first to (N+1)th interference baseband signals, N being a natural number, said desired radio wave signal and said first to (N+1)th interference radio wave signals having substantially the same frequency;
baseband weighting means for weighting said baseband signal with a first coefficient successively renewed such that said desired baseband signal is reproduced;
initial subtracting means coupled to said baseband weighting means;
initial judging means coupled to said initial subtracting means for judging an output of said initial subtracting means;
first to Nth weighting means for weighting said baseband signal with first to Nth coefficients successively renewed such that said first to Nth interference baseband signals are reproduced respectively;
first to Nth subtracting means coupled to said first to Nth weighting means respectively;
first to Nth judging means coupled to said first to Nth weighting means respectively;

(N+1)th weighting means for weighting said baseband signal with an (N+1)th coefficient successively renewed such that said (N+1)th interference baseband signal is reproduced;
(N+1)th judging means coupled to said (N+1)th weighting means; and
N supplying means, an Mth supplying means out of said N supplying means supplying outputs of said (N+1)th to (M+1)th judging means out of said first to (N+1)th judging means to an Mth subtracting means out of said first to Nth subtracting means, M being a natural number smaller than N+1, said Mth subtracting means effecting a subtraction between an output of an Mth weighting means out of said first to Nth weighting means and an output of said Mth supplying means:
further supplying means for supplying outputs of said first to (N+1)th judging means to said initial subtracting means, said initial subtracting means effecting a subtraction between an output of said baseband weighting means and outputs of said further supplying means.

10. A data receiving apparatus as claimed in claim 9, further comprises compensation means for compensating a receiving timing of said received desired baseband signal and a receiving timing of said received first to (N+1)th interference baseband signals.

11. A data receiving apparatus as claimed in claim 9, further comprises removing means for removing delayed components in said desired baseband signal and said first to (N+1)th interference signals.

12. A data receiving apparatus as claimed in claim 9, further comprises removing means for removing delayed components in said desired baseband signal and said first to (N+1)th interference signals and compensation means for compensating a receiving timing of said received desired baseband signal and a receiving timing of said received first to (N+1)th interference baseband signals.

13. A data receiving apparatus as claimed in claim 9, wherein said receiving means comprises a plurality of antennas, said baseband weighting means comprises a plurality of first weighting circuits coupled to said plurality of antennas respectively and first summing means for summing outputs of said plurality of first weighting circuits and supplying a first result to said subtracting means, each of said first to Nth weighting means comprises a plurality of second weighting circuits coupled to said plurality of antennas respectively and second summing means for summing outputs of said plurality of second weighting circuits and supplying a second result to each of said first to Nth subtracting means, and said (N+1)th weighting means comprises a plurality of third weighting circuits coupled to said plurality of antennas respectively and third summing means for summing outputs of said plurality of third weighting circuits and supplying a third result to said (N+1)th judging means.

14. A data receiving apparatus as claimed in claim 13, further comprises removing means for removing delayed components in said desired baseband signal and said first to (N+1)th interference signals.

15. A data receiving apparatus as claimed in claim 13, further comprises compensation means for compensating a receiving timing of said received desired baseband signal and a receiving timing of said received first to (N+1)th interference baseband signals.

16. A data receiving apparatus as claimed in claim 13, further comprises removing means for removing delayed components in said desired baseband signal and said first to (N+1)th interference signals and compensation means for compensating a receiving timing of said received desired baseband signal and a receiving timing of said received first to (N+1)th interference baseband signals.

17. A data receiving apparatus comprising:

receiving means for receiving a desired radio wave signal including a desired baseband signal including first identification information corresponding to identification data and an interference radio wave signal including an interference baseband signal having second identification information to produce a baseband signal including the received desired baseband signal and the received interference baseband signal, said desired radio wave signal and said interference radio wave signal having substantially the same frequency;

first equalizing means for equalizing said baseband signal, detecting which of said desired radio wave signal and said interference baseband signal has a larger intensity, and outputting a detected baseband signal;

detection means for detecting whether identification information in said detected baseband signal corresponds to identification data;

second equalizing means for equalizing said baseband signal such that said desired baseband signal is reproduced, said second equalizing means having subtraction means for subtracting said detected baseband signal from said baseband signal when said identification information does not correspond to said identification data and judging means for judging an output of said subtraction means to reproduce said desired baseband signal.

* * * * *